(12) United States Patent
Celikkaya et al.

(10) Patent No.: US 7,197,896 B2
(45) Date of Patent: Apr. 3, 2007

(54) METHODS OF MAKING $AL_2O_3$-$SIO_2$ CERAMICS

(75) Inventors: Ahmet Celikkaya, Woodbury, MN (US); Thomas J. Anderson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 461 days.

(21) Appl. No.: 10/655,729

(22) Filed: Sep. 5, 2003

(65) Prior Publication Data

US 2005/0056055 A1    Mar. 17, 2005

(51) Int. Cl.
*C03C 10/00* (2006.01)
*C09K 3/14* (2006.01)

(52) U.S. Cl. .................. 65/17.4; 65/21.1; 65/21.5; 65/33.1

(58) Field of Classification Search ............... 264/5–6, 264/10, 12; 51/307–308; 65/17.4, 21.1, 65/21.5, 33.1, 33.7
See application file for complete search history.

(56) References Cited

U.S. PATENT DOCUMENTS

| | | | |
|---|---|---|---|
| 659,926 A | 10/1900 | Jacobs |
| 906,339 A | 12/1908 | Tone |
| 960,712 A | 6/1910 | Saunders |
| 1,037,999 A | 9/1912 | Saunders |
| 1,107,011 A | 8/1914 | Allen |
| 1,149,064 A | 8/1915 | Kalmus |
| 1,161,620 A | 11/1915 | Coulter |
| 1,192,709 A | 11/1916 | Tone |
| 1,240,490 A | 9/1917 | Saunders et al. |
| 1,247,337 A | 11/1917 | Saunders et al. |
| 1,257,356 A | 2/1918 | Hutchins |
| 1,263,708 A | 4/1918 | Saunders et al. |
| 1,263,709 A | 4/1918 | Saunders et al. |
| 1,263,710 A | 4/1918 | Saunders et al. |
| 1,268,533 A | 4/1918 | Allen |
| 1,268,532 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |
| 1,910,444 A | 5/1933 | Nicholson |
| 2,000,857 A | 5/1935 | Masin |
| 2,206,081 A | 7/1940 | Eberlin |
| 2,424,645 A | 7/1947 | Bauman, Jr. et al. |
| 2,538,370 A | 1/1951 | Lerstrup |

(Continued)

FOREIGN PATENT DOCUMENTS

AT        333146        11/1976

(Continued)

OTHER PUBLICATIONS

Search Report from foreign counterpart application, dated Jan. 7, 2003.

(Continued)

*Primary Examiner*—Carlos Lopez

(57) ABSTRACT

Methods for making glasses and glass-ceramics comprising $Al_2O_3$ and $SiO_2$. Glasses made according to the present invention can be made, formed as, or converted into glass beads, articles (e.g., plates), fibers, particles, and thin coatings. Some embodiments of glass-ceramic particles made according to the present invention can be are particularly useful as abrasive particles.

38 Claims, 3 Drawing Sheets

U.S. PATENT DOCUMENTS

| | | |
|---|---|---|
| 2,618,567 A | 11/1952 | Comstock, III |
| 2,805,166 A | 9/1957 | Löffler |
| 2,958,593 A | 11/1960 | Hoover et al. |
| 2,961,296 A | 11/1960 | Fenerty |
| 3,041,156 A | 6/1962 | Rowse et al. |
| 3,141,747 A | 7/1964 | Marshall |
| 3,174,871 A | 3/1965 | Geffcken et al. |
| 3,181,939 A | 5/1965 | Marshall et al. |
| 3,216,794 A | 11/1965 | Roschuk |
| 3,377,660 A | 4/1968 | Marshall et al. |
| 3,498,769 A | 3/1970 | Coes, Jr. |
| 3,625,717 A | 12/1971 | Grubba et al. |
| 3,635,739 A | 1/1972 | Macdowell et al. |
| 3,637,361 A | 1/1972 | Kita et al. |
| 3,646,713 A | 3/1972 | Marshall et al. |
| 3,650,780 A | 3/1972 | Connelly |
| 3,714,059 A | 1/1973 | Shaw et al. |
| 3,717,583 A | 2/1973 | Shaw et al. |
| 3,726,621 A | 4/1973 | Cichy |
| 3,754,978 A | 8/1973 | Elmer et al. |
| 3,781,172 A | 12/1973 | Pett et al. |
| 3,792,553 A | 2/1974 | Schleifer et al. |
| 3,859,407 A | 1/1975 | Blanding et al. |
| 3,881,282 A | 5/1975 | Watson |
| 3,891,408 A | 6/1975 | Rowse et al. |
| 3,893,826 A | 7/1975 | Quinan et al. |
| 3,916,584 A | 11/1975 | Howard et al. |
| 3,926,603 A | 12/1975 | Plesslinger et al. |
| 3,928,515 A | 12/1975 | Richmond et al. |
| 3,940,276 A | 2/1976 | Wilson |
| 3,947,281 A | 3/1976 | Bacon |
| 3,973,977 A | 8/1976 | Wilson |
| 3,996,702 A | 12/1976 | Leahy |
| 4,014,122 A | 3/1977 | Woods |
| 4,035,162 A | 7/1977 | Brothers et al. |
| 4,049,397 A | 9/1977 | Bockstiegel et al. |
| 4,059,417 A | 11/1977 | Ilmaier et al. |
| 4,070,796 A | 1/1978 | Scott |
| 4,073,096 A | 2/1978 | Ueltz et al. |
| 4,111,668 A | 9/1978 | Walker et al. |
| 4,111,707 A | 9/1978 | Komorita et al. |
| 4,126,429 A | 11/1978 | Watson |
| 4,140,494 A | 2/1979 | Coes, Jr. |
| 4,157,898 A | 6/1979 | Walker et al. |
| 4,182,437 A | 1/1980 | Roberts et al. |
| 4,194,887 A | 3/1980 | Ueltz et al. |
| 4,217,264 A | 8/1980 | Mabie et al. |
| 4,218,253 A | 8/1980 | Dworak et al. |
| 4,238,213 A | 12/1980 | Pallo et al. |
| 4,261,706 A | 4/1981 | Blanding et al. |
| 4,311,489 A | 1/1982 | Kressner |
| 4,314,827 A | 2/1982 | Leitheiser et al. |
| 4,316,964 A | 2/1982 | Lange |
| 4,341,533 A | 7/1982 | Daire et al. |
| RE31,128 E | 1/1983 | Walker et al. |
| 4,405,545 A | 9/1983 | Septier et al. |
| 4,415,510 A | 11/1983 | Richmond |
| 4,439,845 A | 3/1984 | Geohegan, Jr. et al. |
| 4,457,767 A | 7/1984 | Poon et al. |
| 4,467,767 A | 8/1984 | Kampichler et al. |
| 4,472,511 A | 9/1984 | Mennemann et al. |
| RE31,725 E | 11/1984 | Walker et al. |
| 4,489,022 A | 12/1984 | Robyn et al. |
| 4,518,397 A | 5/1985 | Leitheiser et al. |
| 4,530,909 A | 7/1985 | Makishima et al. |
| 4,543,107 A | 9/1985 | Rue |
| 4,552,199 A | 11/1985 | Onoyama et al. |
| 4,584,279 A | 4/1986 | Grabowski et al. |
| 4,588,419 A | 5/1986 | Caul et al. |
| 4,595,663 A | 6/1986 | Krohn et al. |
| 4,623,364 A | 11/1986 | Cottringer et al. |
| 4,652,275 A | 3/1987 | Bloecher et al. |
| 4,705,656 A | 11/1987 | Onoyama et al. |
| 4,734,104 A | 3/1988 | Broberg |
| 4,737,163 A | 4/1988 | Larkey |
| 4,741,743 A | 5/1988 | Narayanan et al. |
| 4,744,802 A | 5/1988 | Schwabel |
| 4,751,137 A | 6/1988 | Halg et al. |
| 4,751,138 A | 6/1988 | Halg et al. |
| 4,752,459 A | 6/1988 | Pepper |
| 4,756,746 A | 7/1988 | Kemp, Jr. et al. |
| 4,757,036 A | 7/1988 | Kaar et al. |
| 4,762,677 A | 8/1988 | Dolgin |
| 4,770,671 A | 9/1988 | Monroe et al. |
| 4,772,511 A | 9/1988 | Wood et al. |
| 4,780,268 A | 10/1988 | Papsi et al. |
| 4,789,501 A | 12/1988 | Day et al. |
| 4,799,939 A | 1/1989 | Blocher et al. |
| 4,800,685 A | 1/1989 | Haynes, Jr. |
| 4,812,422 A | 3/1989 | Yuhaku et al. |
| 4,829,031 A | 5/1989 | Roy et al. |
| 4,881,951 A | 11/1989 | Wood et al. |
| 4,898,587 A | 2/1990 | Mera |
| 4,898,597 A | 2/1990 | Mera |
| 4,950,294 A | 8/1990 | Hakamatsuka |
| 4,960,441 A | 10/1990 | Pellow et al. |
| 4,997,461 A | 3/1991 | Markhoff-Matheny et al. |
| 5,007,943 A | 4/1991 | Kelly et al. |
| 5,009,675 A | 4/1991 | Kunz et al. |
| 5,009,676 A | 4/1991 | Rue et al. |
| 5,011,508 A | 4/1991 | Wald et al. |
| 5,013,696 A | 5/1991 | Greskovich et al. |
| 5,023,212 A | 6/1991 | Dubots et al. |
| 5,037,453 A | 8/1991 | Narayanan et al. |
| 5,038,453 A | 8/1991 | Kurita et al. |
| 5,042,991 A | 8/1991 | Kunz et al. |
| 5,057,018 A | 10/1991 | Bowen |
| 5,071,801 A | 12/1991 | Bedard et al. |
| 5,085,671 A | 2/1992 | Martin et al. |
| 5,090,968 A | 2/1992 | Pellow |
| 5,094,672 A | 3/1992 | Giles, Jr. et al. |
| 5,104,319 A | 4/1992 | Evans et al. |
| 5,110,332 A | 5/1992 | Isaksson |
| 5,118,326 A | 6/1992 | Lee et al. |
| 5,122,176 A | 6/1992 | Goettler |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,164,348 A | 11/1992 | Wood |
| 5,185,299 A | 2/1993 | Wood et al. |
| 5,194,072 A | 3/1993 | Rue et al. |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,215,563 A | 6/1993 | LaCourse et al. |
| 5,227,104 A | 7/1993 | Bauer |
| 5,248,318 A | 9/1993 | Tamamaki et al. |
| 5,259,147 A | 11/1993 | Falz et al. |
| 5,273,566 A | 12/1993 | Balcar et al. |
| 5,282,875 A | 2/1994 | Wood et al. |
| 5,312,789 A | 5/1994 | Wood |
| 5,336,280 A | 8/1994 | Dubots et al. |
| 5,352,254 A | 10/1994 | Celikkaya |
| 5,366,523 A | 11/1994 | Rowenhorst et al. |
| 5,372,620 A | 12/1994 | Rowse et al. |
| 5,376,470 A | 12/1994 | Sprouse |
| 5,378,251 A | 1/1995 | Culler et al. |
| 5,378,662 A | 1/1995 | Tsuyuki |
| 5,395,407 A | 3/1995 | Cottringer et al. |
| 5,413,974 A | 5/1995 | Yokoyama et al. |
| 5,417,726 A | 5/1995 | Stout et al. |
| 5,427,595 A | 6/1995 | Pihl et al. |

| | | |
|---|---|---|
| 5,429,647 A | 7/1995 | Larmie |
| 5,431,704 A | 7/1995 | Tamamaki et al. |
| 5,436,063 A | 7/1995 | Follett et al. |
| 5,443,906 A | 8/1995 | Pihl et al. |
| 5,449,389 A | 9/1995 | Yoshizumi et al. |
| 5,484,752 A | 1/1996 | Waku et al. |
| 5,496,386 A | 3/1996 | Broberg et al. |
| 5,498,269 A | 3/1996 | Larmie |
| 5,516,348 A | 5/1996 | Conwell et al. |
| 5,520,711 A | 5/1996 | Helmin |
| 5,534,843 A | 7/1996 | Tsunoda et al. |
| 5,547,479 A | 8/1996 | Conwell et al. |
| 5,549,962 A | 8/1996 | Holmes et al. |
| 5,551,963 A | 9/1996 | Larmie |
| 5,552,213 A | 9/1996 | Eschner |
| 5,569,547 A | 10/1996 | Waku et al. |
| 5,593,467 A | 1/1997 | Monroe |
| 5,605,870 A | 2/1997 | Strom-Olsen et al. |
| 5,609,706 A | 3/1997 | Benedict et al. |
| 5,611,829 A | 3/1997 | Monroe et al. |
| 5,641,469 A | 6/1997 | Garg et al. |
| 5,645,619 A | 7/1997 | Erickson et al. |
| 5,651,925 A | 7/1997 | Ashley et al. |
| 5,653,775 A | 8/1997 | Plovnick et al. |
| 5,665,127 A | 9/1997 | Moltgen et al. |
| 5,679,067 A | 10/1997 | Johnson et al. |
| 5,682,082 A | 10/1997 | Wei et al. |
| 5,693,239 A | 12/1997 | Wang et al. |
| 5,721,188 A | 2/1998 | Sung et al. |
| 5,725,162 A | 3/1998 | Garg et al. |
| 5,733,178 A | 3/1998 | Ohishi |
| 5,733,564 A | 3/1998 | Lehtinen |
| 5,738,696 A | 4/1998 | Wu |
| 5,747,397 A | 5/1998 | McPherson et al. |
| 5,763,345 A | 6/1998 | Ohshima et al. |
| 5,782,940 A | 7/1998 | Jayan et al. |
| 5,804,513 A | 9/1998 | Sakatani et al. |
| 5,847,865 A | 12/1998 | Gopinath et al. |
| 5,856,254 A | 1/1999 | Feige et al. |
| 5,863,308 A | 1/1999 | Qi et al. |
| 5,876,470 A | 3/1999 | Abrahamson |
| 5,902,763 A | 5/1999 | Waku et al. |
| 5,903,951 A | 5/1999 | Ionta et al. |
| 5,952,256 A | 9/1999 | Morishita et al. |
| 5,954,844 A | 9/1999 | Law et al. |
| 5,961,674 A | 10/1999 | Gagliardi et al. |
| 5,975,988 A | 11/1999 | Christianson |
| 5,976,274 A | 11/1999 | Inoue et al. |
| 5,981,413 A | 11/1999 | Hale |
| 5,981,415 A | 11/1999 | Waku et al. |
| 6,053,956 A | 4/2000 | Wood |
| 6,054,093 A | 4/2000 | Torre, Jr. et al. |
| 6,123,743 A | 9/2000 | Carman et al. |
| 6,128,430 A | 10/2000 | Chu et al. |
| 6,146,244 A | 11/2000 | Atsugi et al. |
| 6,245,700 B1 | 6/2001 | Budd et al. |
| 6,251,813 B1 | 6/2001 | Sato |
| 6,254,981 B1 | 7/2001 | Castle |
| 6,268,303 B1 | 7/2001 | Aitken et al. |
| 6,277,161 B1 | 8/2001 | Castro et al. |
| 6,287,353 B1 | 9/2001 | Celikkaya |
| 6,306,926 B1 | 10/2001 | Bretscher et al. |
| 6,335,083 B1 | 1/2002 | Kasai et al. |
| 6,361,414 B1 | 3/2002 | Ravkin et al. |
| 6,362,119 B1 | 3/2002 | Chiba |
| 6,447,937 B1 | 9/2002 | Murakawa et al. |
| 6,451,077 B1 | 9/2002 | Rosenflanz |
| 6,454,822 B1 | 9/2002 | Rosenflanz |
| 6,458,731 B1 | 10/2002 | Rosenflanz |
| 6,461,988 B2 | 10/2002 | Budd et al. |
| 6,469,825 B1 | 10/2002 | Digonnet et al. |
| 6,482,758 B1 | 11/2002 | Weber et al. |
| 6,482,761 B1 | 11/2002 | Watanabe et al. |
| 6,484,539 B1 | 11/2002 | Nordine et al. |
| 6,490,081 B1 | 12/2002 | Feillens et al. |
| 6,511,739 B2 * | 1/2003 | Kasai et al. ................ 428/325 |
| 6,514,892 B1 | 2/2003 | Kasai et al. |
| 6,521,004 B1 | 2/2003 | Culler et al. |
| 6,582,488 B1 | 6/2003 | Rosenflanz |
| 6,583,080 B1 | 6/2003 | Rosenflanz |
| 6,589,305 B1 | 7/2003 | Rosenflanz |
| 6,592,640 B1 | 7/2003 | Rosenflanz et al. |
| 6,596,041 B2 | 7/2003 | Rosenflanz |
| 6,607,570 B1 | 8/2003 | Rosenflanz et al. |
| 6,620,214 B2 | 9/2003 | McArdle et al. |
| 6,666,750 B1 | 12/2003 | Rosenflanz |
| 6,669,749 B1 | 12/2003 | Rosenflanz et al. |
| 6,706,083 B1 | 3/2004 | Rosenflanz |
| 6,749,653 B2 | 6/2004 | Castro et al. |
| 2001/0030811 A1 | 10/2001 | Kasai et al. |
| 2002/0066233 A1 | 6/2002 | McArdle et al. |
| 2002/0160694 A1 * | 10/2002 | Wood et al. .................. 451/41 |
| 2003/0040423 A1 | 2/2003 | Harada et al. |
| 2003/0107090 A1 | 6/2003 | Kumeno |
| 2003/0110706 A1 | 6/2003 | Rosenflanz |
| 2003/0110707 A1 | 6/2003 | Rosenflanz |
| 2003/0110708 A1 | 6/2003 | Rosenflanz |
| 2003/0110709 A1 | 6/2003 | Rosenflanz et al. |
| 2003/0115805 A1 | 6/2003 | Rosenflanz et al. |
| 2003/0126802 A1 | 7/2003 | Rosenflanz |
| 2003/0126803 A1 | 7/2003 | Rosenflanz |
| 2003/0126804 A1 | 7/2003 | Rosenflanz et al. |
| 2003/0145525 A1 * | 8/2003 | Rosenflanz ................ 51/307 |
| 2003/0172594 A1 * | 9/2003 | Castro et al. ................ 51/307 |
| 2004/0020245 A1 | 2/2004 | Rosenflanz |
| 2004/0023078 A1 | 2/2004 | Rosenflanz et al. |
| 2004/0148868 A1 | 8/2004 | Anderson et al. |
| 2004/0148869 A1 | 8/2004 | Celikkaya et al. |
| 2004/0148870 A1 | 8/2004 | Celikkaya et al. |
| 2004/0148966 A1 | 8/2004 | Celikkaya et al. |
| 2004/0148967 A1 | 8/2004 | Celikkaya et al. |
| 2005/0075233 A1 | 4/2005 | Weber et al. |

FOREIGN PATENT DOCUMENTS

| | | |
|---|---|---|
| DE | 20 34 011 | 7/1970 |
| DE | 134 638 A | 3/1979 |
| DE | 141 420 | 4/1980 |
| EP | 0 200 487 | 11/1986 |
| EP | 0 227 374 | 7/1987 |
| EP | 0 236 507 | 9/1987 |
| EP | 0 291 029 A1 | 11/1988 |
| EP | 0 408 771 A1 | 1/1991 |
| EP | 0 469 271 | 2/1992 |
| EP | 0 480 678 A1 | 4/1992 |
| EP | 0 494 638 | 7/1992 |
| EP | 0 495 536 A2 | 7/1992 |
| EP | 0 579 281 A1 | 1/1994 |
| EP | 0 601 453 A2 | 6/1994 |
| EP | 0 647 601 A1 | 4/1995 |
| EP | 0 666 238 B1 | 8/1995 |
| EP | 0 666 239 B1 | 8/1995 |
| EP | 0 709 347 | 5/1996 |
| EP | 0 722 919 A1 | 7/1996 |
| EP | 0 291 029 B2 | 11/1996 |
| FR | 1547989 | 10/1968 |
| FR | 2 118 026 | 7/1972 |
| FR | 2 538 370 | 6/1984 |
| FR | 2 609 708 | 7/1988 |
| GB | 793503 | 4/1958 |
| GB | 1005338 | 9/1965 |
| GB | 1 121 875 | 7/1968 |
| GB | 1 260 933 A | 1/1972 |
| GB | 2 116 992 | 10/1983 |
| GB | 2 377 438 A | 1/2003 |
| JP | 50-25608 | 3/1975 |

| | | | |
|---|---|---|---|
| JP | 59 22 7726 A | 12/1984 | |
| JP | 60-221338 | 11/1985 | |
| JP | 61099665 | 5/1986 | |
| JP | 62-003041 | 1/1987 | |
| JP | 63-156024 | 6/1988 | |
| JP | 63-303821 | 12/1988 | |
| JP | 4-119941 | 4/1992 | |
| JP | 05-085821 | 4/1993 | |
| JP | 05-226733 | 9/1993 | |
| JP | 06 040765 A | 2/1994 | |
| JP | 06-171974 | 6/1994 | |
| JP | 03113428 A | 5/1999 | |
| JP | 11-189926 | 7/1999 | |
| JP | 10-208229 | 2/2000 | |
| JP | 10-208244 | 2/2000 | |
| JP | 200045128 A | 2/2000 | |
| JP | 200045129 A | 2/2000 | |
| JP | 201294480 | 10/2001 | |
| JP | 2003-94414 | 4/2003 | |
| KR | 9601009 B1 | 1/1996 | |
| SU | 1455569 | 10/1996 | |
| WO | WO 94/14722 | 7/1994 | |
| WO | WO 97/16385 | 5/1997 | |
| WO | WO 97/25284 | 7/1997 | |
| WO | WO 00/34201 | 6/2000 | |
| WO | WO 01/16047 A2 | 3/2001 | |
| WO | WO 01/23321 A1 | 4/2001 | |
| WO | WO 01/23323 A1 | 4/2001 | |
| WO | WO 01/27046 A1 | 4/2001 | |
| WO | WO 01/56946 A | 8/2001 | |
| WO | WO 01/56947 A | 8/2001 | |
| WO | WO 01/56949 A | 8/2001 | |
| WO | WO 01/56950 A | 8/2001 | |
| WO | WO 02/08146 A | 1/2002 | |
| WO | WO 03/011776 A1 | 2/2003 | |
| WO | WO 03/011782 A2 | 2/2003 | |
| WO | WO 03/011783 A2 | 2/2003 | |
| WO | WO 03/011786 A1 | 2/2003 | |

OTHER PUBLICATIONS

Article: Imakoa, Minoru et al., "Refractive Index and Abbe's Number of Glass of Lanthanum Borate System," *Journal Ceramic Assoc. Japan*, vol. 70, No. 5, (1962), pp. 115 et seq.
Book Excerpt: Kingery, W.D., *Introduction to Ceramics*, Second Edition, Chpt. III subchapter 8.8, Glass-Ceramic Materials, (1976), pp. 368-374,.
Article: Kokubo, Tadashi et al., "Infrared Transmission of ($R_2O$ or R'O)-($TiO_2$, $Nb_2O_5$ or $Ta_2O_5$)-$Al_2O_3$ Glasses," *Journal of Non-Crystalline Solids 22*, (1970), pp. 125-134.
Book: McMillan, P.W., *Glass-Ceramics*, Academic Press, Inc., 2nd Edition (1979). (Too Voluminous).
Symposium: Stookey, "Ceramics Made by Nucleation of Glass—Comparison of Microstructure and Properties with Sintered Ceramics," (1962), pp. 1-4.
Book Excerpt: Varshneya, *Fundamentals of Inorganic Glasses*, (1994), pp. 425-427.
Symposium: Weber et al., "Rare Earth Oxide—Aluminum Oxide Glasses for Mid-Range IR Devices," Containerless Research, Inc., BIOS 2003, Optical Fibers and Sensors for Medical Applications III, Conference 4957, (2003), 7 pages.
Symposium: Weber et al., "Device Materials Based on Er-, Ho-, Tm-, and Yb-Doped Rare Earth Aluminum Oxide (REAL™) Glass," Containerless Research, Inc., BIOS 2003, Optical Fibers and Sensors for Medical Applications III, Conference 4957, (2003), 7 pages.
Aasland and McMillan, Nature 369, 633 (1994).
Aguilar et al, "Melt Extraction Processing of Structural $Y_2O_3$-$Al_2O_3$ Fibers", J. Eur. Ceram. Soc. 20 1091-1098 (2000).
Gandhi, A.S. and Jarayam, V., "Pressure Consolidation of Amorphous $ZrO_2$-$Al_2O_3$ by Plastic Deformation of Powder Particles", Acta Materiala, 50 (2002), 2137-2149.
Gonzalez, Eduardo J., et al., "High Pressure Compaction and Sintering of Nano-Size $\gamma$-$Al_2O_3$ Powder", *Materials and Manufacturing Processes* vol. 11, No. 6, 951-967, 1996.
Jantzen, C.M., Krepski, R.P., & Herman, H., "Ultra-Rapid Quenching of Laser-Method Binary and Unary Oxides", *Mat. Res. Bull.* 15, 1313-1326 (1980).
Khor K.A., "Novel ZrO2-Mullite Composites Produced By Plasma Spraying", Proceedings of the 15th International Thermal Pray Conference, May 25-29, 1998, Nice, France.
Ray, C.S. and Day, D.E., "Determining the Nucleation Rate Curve for Lithium Disilicate Glass by Differential Thermal Analysis", J. Am. Ceram. Soc. 73(2) 439-442 (1990).
Schmucker, M, et al., "Constitution of Mullite Glasses Produced by Ultra-Rapid Quenching of Plasma-Sprayed Melts", Journal of the European Ceramic Society 15 (1995) 1201-1205.
Sarjeant, P.T, & Roy, R., in *Reactivity of Solids* (ed. J. W. Mitchell, R.C., DeVries, R.W., Roberts and P. Cannon) 725-33 (John Wiley & Sons, Inc., New York 1969).
Takamori, T., & Roy, R., "Rapid Crystallization of SiO2-Al2O3 Glasses", Journal of American Society, vol. 56, No. 12, Dec. 1973.
Weber et al., "Synthesis and Optical Properties of Rare-Earth-Aluminum Oxide Glasses", J. Am. Ceram. Soc. 85(5) 1309-1311 (2002).
Wilding, M.C., McMillan, P.F., "Polyamorphic Transitions in Yttria-Alumina Liquids", *J. Non-Cryst. Solids*. 293-295, 357-365 (2001).
"$Gd_3Al_5O_{12}$ Phase Obtained by Crystallization of Amorphous $Gd_2O_3$ ⅝ $Al_2O_3$," Shishido et al., *Journal of the American Ceramic Society*, vol. 61, No. 7-8, Jul.-Aug. 1978, pp. 373-374.
"Rapid Quenching on the Binary Systems of High Temperature Oxides," Suzuki et al., *Mat. Res. Bull.*, vol. 9, 1974, pp. 745-754.
"Unusual Glass Formation in the Al-Nd-O System," Yajima et al., Chemistry Letters (published by the Chemical Society of Japan), 1973, pp. 741-742.
Glass Formation in the Ln-Al-O System, (Ln: Lanthanoid and Yttrium Elements), Yajima et al., Chemistry Letters, 1973, pp. 1327-1330.
"Production and Studies of Alumina Based Refractory Glass," Coutures et al., *Mat. Res. Bull.*, vol. 10, No. 6, 1975, pp. 539-546.
"Net Optical Gain at 1.53μm in Er-Doped $Al_2O_3$ Waveguides on Silicon," van den Hoven et al., Appl. Phys. Lett. 68 (14), Apr. 1, 1966, pp. 1886-1888.
"Durable 3-5 μm Transmitting Infrared Window Materials," Harris et al., Infrared Physics & Technology 39, 1998, pp. 185-201.
"Erbium-Doped Phosphate Glass Waveguide on Silicon With 4.1 dB/cm Gain at 1.535 μm," Yan et al., Appl. Phys. Lett, 71 (20), Nov. 17, 1997.
Abstract for "Kinetics of Nonisothermal Sintering of Some Eutectic Oxide Compositions," I. Yu Volkova et al., 1986 (abstract from Database Chemabs 'Online! Chemical Abstracts Service, Columbus, Ohio, US).
"Eutectic Precipitation of the Spinel Solid Solution-Yttrium Aluminum Garnet (YAG) System," Shuqiang Wang et al., *Journal of the American Ceramic Society*, 1998, vol. 81, No. 1, pp. 263-265.
"Microstructures of laser-treated $Al_2O_3$-$ZrO_2$-$CeO_2$ composites," Zan-Hwey Chen et al., *Materials Science & Engineering A (Structural Materials: Properties, Microstructure and Processing)*, 1995, vol. A196, No. 1-2, pp. 253-260.
"Advances in the Grinding Efficiency of Sintered Alumina Abrasives," Andreas Krell et al., *Journal of the American Ceramic Society*, 1996, vol. 79, No. 3, pp. 763-769.
"Interface modification for increased fracture toughness in reaction-formed yttrium aluminum garnet/alumina eutectic composites," Luke N. Brewer et al., 1999, vol. 14, No. 10, pp. 3907-3912.
Dow Jones Interactive Internet Printout on Jun. 20, 2001 for web address "http://ptg.djnr.com/ccroot/asp/publib/story.asp"; "China's Rare Earth Industry In the Doldrums", Asia Pulse, Jan. 28, 1999, 2 pages.
Dow Jones Interactive Internet Printout on Jun. 20, 2001 for web address "http://ptg.djnr.com/ccroot/asp/publib/story.asp"; "China's Rare Earth Export Quota Set at 45,000 Tons", Asia Pulse, Jan. 9, 2001, 1 page.

Dow Jones Interactive Internet Printout on Jun. 20, 2001 for web address "http://ptg.djnr.com/ccroot/asp/publib/story.asp"; "ELEMENTS: China to Impose Quotas on Rare Earth Exports", Chemical Business NewsBase, Feb. 4, 1999, 1 page.

Dow Jones Interactive Internet Printout on Jun. 20, 2001 for web address "http://ptg.djnr.com/ccroot/asp/publib/story.asp"; "Rare Earth Prices and Market Outlook", Chemical Business NewsBase, May 27, 1999, 2 pages.

Dow Jones Interactive Internet Printout on Jun. 20, 2001 for web address "http://ptg.djnr.com/ccroot/asp/publib/story.asp"; "In Asia", Engineering & Mining Journal, Feb. 28, 2000, 4 pages.

Dow Jones Interactive Internet Printout on Jun. 20, 2001 for web address "http://ptg.djnr.com/ccroot/asp/publib/story.asp"; "Rare Earths: An Industry Review and Market Outlook—Part 1", Chemical Business NewsBase, Dec. 8, 2000, 2 pages.

Dow Jones Interactive Internet Printout on Jun. 20, 2001 for web address "http://ptg.djnr.com/ccroot/asp/publib/story.asp"; "Traders' View on Chemical Business (Part 2): Rare Earth: Market Confusion Inevitable Due to China's Unstable Supply", Chemical Business NewsBase, Aug. 10, 2000, 2 pages.

"China: Oversupply Puts Rare Earths Projects On Hold", Industrial Minerals, Aug. 1997, 1 page.

"Increase in Value of Rare Earth Products Boosts Yixing Xinwei", W. Yau, South China Morning Post, Apr. 12, 2000, 2 pages.

"Rare Earth—Market Confusion Inevitable Due to China's Unstable Supply", Japan Chemical Week, vol. 41, No. 2080, Jul. 6, 2000, pp. 6-7.

"Rare Earths Prices Recover Despite China's Overcapacity", Louise Rodriquez, America Metal Market, vol. 109, No. 14, Jan. 22, 2001, p. 13.

"Prices: Minerals", Asian Ceramics & Glass, Jan. 2001, 2 pages.

"China Rare Earth Information", China Rare Earth Information Center, vol. 6, No. 4, Aug. 2000, 3 pages.

"Microstructure and Thermal Stability of $Al_2O_3/Y_3Al_5O_{12}$ (YAG) Eutectic Composite Prepared by an Arc Discharge Method", T. Isobe et al., J. Ceram. Soc. Jap., 109, [1], 2001, pp. 66-70, Abstract in English.

"Divorced Eutectic and Interface Characteristics in a Solidified YAG-Spinel Composite With Spinel-Rich Composition", S. Wang et al., J. Mat. Sci., 35, 2000, pp. 2757-2761.

"Processing, Microstructure, and Strength of Alumina-YAG Eutectic Polycrystals", Tai-Il Mah et al., J. Am. Ceram. Soc., 83, [8], 2000, pp. 2088-2090.

"Phase Identification of $Al_2O_3/RE_3Al_5O_{12}$ and $Al_2O_3/REAlO_3$ (RE=Sm-Lu, Y) Eutectics", J. Crystal Growth, 218, 2000, pp. 67-73.

"Crystallization and Thermal Properties of $Al_2O_3$-$Y_2O_3$ Melts", S. V. Stankus et al., J. Crystal Growth, 167, 1996, pp. 165-170.

Dialog © file 319: Chem Bus NewsBase © 2001 Royal Soc Chemistry. Abstract for "China: Oversupply Puts Rare Earths Projects On Hold", Industrial Minerals n 359, p. 10.

"Rare-Earth Metals", J. Hedrick, pp. 61.1-61.6, 1997.

"Rare-Earth Metal Prices in the USA ca. 1960 to 1994", J. Hedrick, J. Alloys and Compounds, 1997, pp. 471-481.

"Preliminary data on subsolidus phase equilibria in the $La_2O_3$-$Al_2O_3$-$Mn_2O_3$ and $La_2O_3$-$Al_2O_3$-$Fe_2O_3$ systems", Hrovat et al., Journal of Materials Science Letters, vol. 14, 1995, pp. 265-267.

"Aspects of Synthesis of Decorite Opacified Glass", Keramika, Glass and Ceramics, vol. 58, Nos. 1-2, pp. 8-11, Jan. 2001.

"A New Ceramic Eutectic Composite with High Strength at 1873 K", Yoshiharu Waku, Advanced Materials, vol. 10, No. 8, 1998, pp. 615-617.

"Synthesis of Y-Al Garnet", Krokhin et al., Glass and Ceramics, vol. 55, Nos. 5-6, 1998, pp. 151-152.

"High-temperature strength and thermal stability of a unidirectionally solidified $Al_2O_3$/YAG eutectic composite", Waku et al., pp. 1217-1225.

"Sapphire matrix composites reinforced with single crystal VAG phases", Waku et al., Journal of Materials Science, vol. 31, 1996, pp. 4663-4670.

"Thermo-Mechanical Stability Of Directionally Solidified $Al_2O_3$-$ZrO_2(Y_2O_3)$ Eutectic Fibers", Yang and Zhu, Scripta Materialia, vol. 36, No. 8, 1997, pp. 961-965.

"A ductile ceramic eutectic composite with high strength at 1,873 K", Waku et al., Nature, vol. 389, Sep. 1997, pp. 49-52.

"The Liquidus Surface In The $Al_2O_3$-$ZrO_2$-$Y_2O_3$ Phase Diagram", Lakiza et al., Powder Metallurgy and Metal Ceramics, vol. 33, No. 11-12, 1994, pp. 595-597.

"Powder-Material Research Methods And Properties Polythermal Sections Of The $Al_2O_3$-$ZrO_2$-$Y_2O_3$ Phase Diagram", Lakiza et al., Powder Metallurgy and Metal Ceramics, vol. 34, No. 11-12, 1995, pp. 655-659.

"Metastable Phase Relationships In The System $AL_2O_3$-$ZrO_2$-$Y_2O_3$", Lakiz and Lopato, Powder Metallurgy and Metal Ceramics, vol. 35, Nos. 11-12, 1996, pp. 621-626.

"Solidus Surface And Phase Equilibria During The Solidification Of Alloys In The $Al_2O_3$-$ZrO_2$-$Y_2O_3$ System", Lakiza et al., Powder Metallurgy and Metal Ceramics, vol. 34, Nos. 1-2, 1995, pp. 64-67.

"Methods Of Investigation Of Properties Of Powder Materials, Interactions In The $Al_2O_3$-$ZrO_2$-$Y_2O_3$ System", Lakiza et al., Powder Metallurgy and Metal Ceramics, vol. 33, Nos. 9-10, 1994, pp. 486-490.

"Rapid Solidification of Ceramics a Technology Assessment", Brockway et al. Metals and Ceramics Information Center, MCIC Report, Jan. 1984 MCIC 84-49.

Figs. 311, 346, 350, 354-56, 373, and 716, Phase Diagrams For Ceramists, The American Ceramic Society, 1964, pp. 122, 136, 138, 140, 144, 248.

Figs. 2340-44, 2363, 2370, 2374-75, 2382-83, 2385, 2387, 2390, and 2392, Phase Diagrams For Ceramists, 1969 Supplement, The American Ceramic Society, 1969, pp. 95-96, 100, 102-103, 105-108.

Figs. 4366-71, 4377-78, 4404-05, 4417, 4426, 4430, 4433, 4437, 4440, 4444, 4457, 4572, and 4602, Phase Diagrams For Ceramists, 1975 Supplement, The American Ceramic Society, 1975, pp. 130-132, 135-136, 147, 152, 157, 159-160, 163-164, 166, 172-173, 238, 257.

Figs. 5042, 5211, 5217, 5224, 5228, 5232, 5237, 5239, 5241, 5245, 5251, 5257, 5418, and 5437, Phase Diagrams For Ceramists, vol. IV, The American Ceramic Society, 1981, pp. 29, 125, 127, 129-131, 133, 135-137, 139, 141, 143, 220, 228.

Fig. 6464, Phase Diagrams For Ceramists, vol. VI, The American Ceramic Society, 1981, p. 162.

Figs. 9262, and 9264, Phase Diagrams For Ceramists, vol. XI, Oxides, The American Ceramic Society, 1995, pp. 105-106.

"Phase Equilibria in the Yttrium Oxide-Alumina System", Toropov et al., Bulletin of the Academy of Sciences, USSR, Division of Chemical Science, No. 7, Jul. 1964, pp. 1076-1081, A translation of Seriya Khimicheskaya.

McKittrick, Joanna, et al., "Non-stoichiometry and defect structures in rapidly solidified $MgO$-$Al_2O_3$-$ZrO_2$ ternary eutectics," Materials Science and Engineering A231 (1997) 90-97.

Weber, J.K. Richard et al., "Glass fibres of pure and erbium- or neodymium-doped yttria-alumina compositions", Nature, Jun. 25, 1998, vol. 393, pp. 769-771.

Waku, Yoshiharu, et al., "A jelly-like ceramic fiber at 1193 K", Mat Res Innovat, 2000, vol. 3, pp. 185-189.

Weber, J.K. Richard et al., "Glass Formation and Polyamorphism in Rare-Earth Oxide-Aluminum Oxide Compositions", J. American Ceramic Society, 83 [8], 2000, 1868-1872.

Aguilar, E.A., "Processing and crystallization of rapidly solidified $Al_2O_3$-$Y_2O_3$ fibres", British Ceramic Transactions, 2000, vol. 99, No. 6, pp. 256-259.

Kondrashov V I et al., "Opacified Glass "Decorit" Synthesis Directions," Steklo I Keramika 2001, No. 1, pp. 8-11.

Article: Bagaasen et al., "Silicon-Free Oxynitride Glasses Via Nitridation of Aluminate Glassmelts," Journal of the American Ceramic Society, Apr. 1983, pp. C-69-C-71.

Article: Durham et al., "Low Silica Calcium Aluminate Oxynitride Glasses," Materials Letters, vol. 7, No. 5,6, Nov. 1988, pp. 208-210.

Article: O'Meara et al., "Formation, Crystallisation and Oxidation of Selected Glasses in the Y-Si-Al-O-N System," Journal of the European Ceramic Society, 8 (1991) pp. 161-170.

Article: Rosenflanz et al., "Bulk Glasses and Ultrahard Nanoceramics Based on Alumina and Rare-Earth Oxides," Letters to Nature, vol. 430, Aug. 12, 2004, pp. 761-764.

Article: Sarjeant et al., "Experimental Data on Formation of New Non-Crystalline Solid (NCS) Phases," *Formation of New NCS Phases*, date unknown but believed to be prior to the filing date of the instant application, pp. 725-733.

Standard: "Standard Specification for Wire Cloth and Sieves for Texting Purposes[1]," *ASTM International*, Designation: E 11-01, May 10, 2001, pp. 1-5.

ASTM Specification E-11, date unknown but believed to be prior to the filing date of the instant application, pp. 3-6.

Standard: "Standard Specification for Industrial Woven Wire Cloth[1]," *ASTM International*, Apr. 10, 1999, pp. 1-30.

Book Excerpt: Tredway et al., "Multianion Glasses," *Non-Oxide Technical and Engineering Ceramics*, Stuart Hampshire, date unknown but believed to be prior to the filing date of the instant application, pp. 203-212.

Article: Wu et al., "Liquid-Phase Sintering of Alumina with YSiAlON Oxynitride Glass," *Materials Letters*, 57 (2003) pp. 3521-3525.

U.S. Patent Application entitled "Fused $Al_2O_3$-$Y_2O_3$ Eutectic Abrasive Particles, Abrasive Articles, And Methods Of Making And Using The Same", filed Feb. 2, 2000, Rosenflanz et al. having U.S. Appl. No. 09/496,442.

U.S. Patent Application entitled "Fused Abrasive Particles, Abrasive Articles, And Methods Of Making And Using The Same", filed Feb. 2, 2000, Rosenflanz et al. having U.S. Appl. No. 09/496,638.

U.S. Patent Application entitled "Fused Abrasive Particles, Abrasive Articles, and Methods of Making and Using the Same," filed Feb. 2, 2000, Rosenflanz et al. having U.S. Appl. No. 09/495,978.

U.S. Patent Application entitled "Fused $Al_2O_3$-$Y_2O_3$-$ZrO_2$ Eutectic Abrasive Particles, Abrasive Articles, And Methods Of Making And Using The Same", filed Jul. 19, 2000, Rosenflanz having U.S. Appl. No. 09/618,876.

U.S. Patent Application entitled "Fused $Al_2O_3$ Rare Earth Oxide $ZrO_2$ Eutectic Materials", filed Feb. 2, 2001, Rosenflanz having U.S. Appl. No. 09/496,713.

U.S. Patent Application entitled "$Al_2O_3$-Rare Earth Oxide-$ZrO_2$/$HfO_2$ Materials, and Methods of Making and Using the Same", filed Aug. 2, 2002, Rosenflanz having U.S. Appl. No. 10/211,597.

U.S. Patent Application entitled "Abrasive Particles, and Methods of Making and Using the Same", filed Aug. 2, 2001, Rosenflanz having U.S. Appl. No. 09/922,528.

U.S. Patent Application entitled "Method of Making Ceramic Articles", filed Aug. 2, 2001, Rosenflanz having U.S. Appl. No. 09/922,526.

U.S. Patent Application entitled "Method of Making Ceramic Articles", filed Aug. 2, 2002, Rosenflanz having U.S. Appl. No. 10/211,481.

U.S. Application entitled "Ceramics and Methods of Making the Same," Celikkaya et al., filed Feb. 5, 2003, having U.S. Appl. No. 10/358,910.

U.S. Application entitled "$Al_2O_3$-$La_2O_3$-$Y_2O_3$-MgO Ceramics, and Methods of Making the Same," Celikkaya et al., filed Feb. 5, 2003, having U.S. Appl. No. 10/358,855.

U.S. Application entitled "Methods of Making $Al_2O_3$-$SiO_2$ Ceramics," Celikkaya et al., filed Feb. 5, 2003, having U.S. Appl. No. 10/358,708.

U.S. Patent Application entitled "Method of Making Abrasive Particles", filed Dec. 18, 2003, having U.S. Appl. No. 10/739,624.

U.S. Patent Application entitled "Ceramics, and Methods of Making and Using the Same", filed Jul. 29, 2004, having U.S. Appl. No. 10/902,455.

U.S. Patent Application entitled "Method of Making Ceramic Articles", filed Jul. 29, 2004, having U.S. Appl. No. 10/901,638.

U.S. Application entitled "Methods of Making Ceramics Comprising $AL_2O_3$, REO, $ZRO_2$ and/or $HfO_2$ and $Nb_2O_5$ and/or $Ta_2O_5$," Rosenflanz, filed Sep. 18, 2003, having U.S. Appl. No. 10/666,615.

U.S. Application entitled "Methods of Making Ceramic Particles," Celikkaya et al., filed Feb. 5, 2003, having U.S. Appl. No. 10/358,772.

U.S. Application entitled "Methods of Making Ceramics," Anderson et al., filed Feb. 5, 2003, having U.S. Appl. No. 10/358,765.

U.S. Application entitled "Ceramics Comprising $AL_2O_3$, REO, $ZRO_2$ and/or $HfO_2$ and $Nb_2O_5$ and/or $Ta_2O_5$ and Methods of Making the Same," Rosenflanz et al., filed Sep. 18, 2003, having U.S. Appl. No. 10/666,212.

U.S. Application entitled "Ceramics Comprising $AL_2O_3$, $Y_2O_3$, $ZRO_2$ and/or $HfO_2$ and $Nb_2O_5$ and/or $Ta_2O_5$ and Methods of Making the Same," Rosenflanz et al., filed Sep. 18, 2003, having U.S. Appl. No. 10/666,098.

U.S. Application entitled "Alumina-Yttria Particles and Methods of Making the Same," Anderson et al., filed Dec. 18, 2003, having U.S. Appl. No. 10/740,262.

U.S. Application entitled "Method of Making Abrasive Particles," Anderson et al., filed Dec. 18, 2003, having U.S. Appl. No. 10/739,420.

U.S. Application entitled "Transparent Fused Crystalline Ceramic, and Method of Making the Same," Rosenflanz et al., filed Dec. 18, 2003, having U.S. Appl. No. 10/739,439.

U.S. Application entitled "Method of Making Abrasive Particles," Anderson et al., filed Dec. 18, 2003, having U.S. Appl. No. 10/739,440.

U.S. Application entitled "Method of Making Abrasive Particles," Celikkaya et al., filed Dec. 18, 2003, having U.S. Appl. No. 10/740,096.

U.S. Application entitled "Method of Making Abrasive Particles," Celikkaya et al., filed Dec. 18, 2003, having U.S. Appl. No. 10/739,441.

U.S. Application entitled "Powder Feeding Method and Apparatus," Celikkaya et al., filed Dec. 18, 2003, having U.S. Appl. No. 10/739,233.

U.S. Application entitled "Use of Ceramics in Dental and Orthodontic Applications," Cummings et al., filed Feb. 5, 2003, having U.S. Appl. No. 10/358,856.

U.S. Application entitled "Use of Glasses Containing Rare Earth Oxide, Alumina, and Zirconia and Dopant in Optical Waveguides," Cummings et al., filed Apr. 28, 2003, having U.S. Appl. No. 10/425,039.

U.S. Application entitled "Ceramic Aggregate Particles," McArdle et al., filed Feb. 11, 2004, having U.S. Appl. No. 10/776,156.

Fused Abrasive Particles, Abrasive Articles, and Methods of Making and Using The Same, filed Feb. 2, 2000, having U.S. Appl. No. 09/495,978, now abandoned.

Fused Abrasive Particles, Abrasive Articles, and Methods of Making and Using The Same, filed Feb. 2, 2000, having U.S. Appl. No. 09/496,442, now abandoned.

Fused Abrasive Particles, Abrasive Articles, and Methods of Making and Using The Same, filed Feb. 2, 2000, having U.S. Appl. No. 09/496,638, now abandoned.

Fused Abrasive Particles, Abrasive Articles, and Methods of Making and Using The Same, filed Feb. 2, 2000, having U.S. Appl. No. 09/496,713, now abandoned.

Fused $Al_2O_3$-$Y_2O_3$-$ZrO_2$ Eutectic Abrasive Particles, Abrasive Articles, And Methods Of Making And Using The Same, filed Jul. 19, 2000, having U.S. Appl. No. 09/618,876, now pending.

Method of Making Ceramic Articles, filed Aug. 2, 2001, having U.S. Appl. No. 09/922,526, now abandoned.

$Al_2O_3$-Rare Earth Oxide-$ZrO_2$/$HfO_2$ Materials, and Methods of Making and Using the Same, filed Aug. 2, 2001, having U.S. Appl. No. 09/922,527, now abandoned.

Abrasive Particles, and Methods of Making and Using the Same, filed Aug. 2, 2001, having U.S. Appl. No. 09/922,528, now abandoned.

$Al_2O_3$-$Y_2O_3$-$ZrO_2$ Materials, and Methods of Making and Using the Same, filed Aug. 2, 2001, having U.S. Appl. No. 09/922,530, now abandoned.

* cited by examiner

METHODS OF MAKING AL₂O₃-SIO₂ CERAMICS

BACKGROUND

A large number of glass and glass-ceramic materials are known. The majority of oxide glass systems utilize well-known glass-formers such as $SiO_2$, $B_2O_3$, $P_2O_5$, $GeO_2$, $TeO_2$, $As_2O_3$, and $V_2O_5$ to aid in the formation of the glass. Some of the glass compositions formed with these glass-formers can be heat-treated to form glass-ceramics. The glass-ceramics tend to be more temperature resistant than the glass from which they are formed.

Although there are a variety of techniques for making glasses and glass-ceramics, additional novel techniques are desired.

SUMMARY

The present invention provides methods of making glasses and glass-ceramics comprising $Al_2O_3$ and $SiO_2$, wherein the methods utilize at least one of polymeric $SiO_2$ source or organometallic $SiO_2$ source. Typically, glasses provided by a method according to the present invention have a $T_g$ and a $T_x$, wherein $T_x-T_g$ is at least 20° K (in some embodiments, at least 25° K).

In one exemplary method according to the present invention for making glass comprising at least 35 (in some embodiments, at least 40, 45, 50, 55, 60, 65, 70, 75, 80, 85, or even at least 90) percent by weight $Al_2O_3$ and $SiO_2$ in a range from 0.5 to 10 percent by weight (in some embodiments, 0.5 to 5 or 1 to 3), and not more than 10 (in some embodiments, not more than 9, 8, 7, 6, 5, 4, 3, 2, 1, 0.5, 0.1, or even zero) percent by weight collectively $As_2O_3$, $B_2O_3$, $GeO_2$, $P_2O_5$, $SiO_2$, $TeO_2$, and $V_2O_5$, based on the total weight of the glass, the method comprises:

feeding at least $Al_2O_3$ source and $SiO_2$ source into one of a flame or a plasma to provide a melt, wherein the $SiO_2$ source is at least one of polymeric $SiO_2$ source or organometallic $SiO_2$ source; and cooling the melt to provide the glass. Optionally, the glass further comprises at least one metal oxide other than $Al_2O_3$ and $SiO_2$ (e.g., $Y_2O_3$, $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Tb_2O_3$, $Th_4O_7$, $Tm_2O_3$, $Yb_2O_3$, MgO, $TiO_2$, $Cr_2O_3$, CuO, $ZrO_2$, SrO, $LiO_2$, NiO, $Fe_2O_3$, and combinations thereof). Optionally, the method further comprises heat-treating the glass to convert at least a portion of the glass to crystalline ceramic and provides glass-ceramic. In some embodiments, the glass is in the form of glass particles, and the method further comprises heat-treating the glass to convert at least a portion of the glass to crystalline ceramic and provide the glass-ceramic abrasive particles. In some embodiments, glass particles to be heat-treated are provided as a plurality of particles having a specified nominal grade, and wherein at least a portion of the particles is a plurality of the glass particles. In some embodiments, the method further comprises heat-treating the glass to convert at least a portion of the glass to crystalline ceramic and provide the glass-ceramic and crushing the glass-ceramic to provide abrasive particles. In some embodiments, the abrasive particles are graded to provide a plurality of abrasive particles having a specified nominal grade.

In one exemplary method according to the present invention for making an article, the method comprises:

feeding at least $Al_2O_3$ source and $SiO_2$ source into one of a flame or a plasma to provide a melt, wherein the $SiO_2$ source is at least one of polymeric $SiO_2$ source or organometallic $SiO_2$ source;

cooling the melt to provide glass beads, wherein the glass comprises at least 35 (in some embodiments, at least 40, 45, 50, 55, 60, 65, 70, 75, 80, 85, or even at least 90) percent by weight $Al_2O_3$ and $SiO_2$ in a range from 0.5 to 10 (in some embodiments, 0.5 to 5 or 1 to 3) percent by weight, and not more than 10 (in some embodiments, not more than 9, 8, 7, 6, 5, 4, 3, 2, 1, 0.5, 0.1, or even zero) percent by weight collectively $As_2O_3$, $B_2O_3$, $GeO_2$, $P_2O_5$, $SiO_2$, $TeO_2$, and $V_2O_5$, based on the total weight of the glass, the glass having a $T_g$;

heating the glass beads above the $T_g$ such that the glass beads coalesce to form a shape;

cooling the coalesced shape to provide a glass article. Optionally, the glass further comprises at least one metal oxide other than $Al_2O_3$ and $SiO_2$ (e.g., $Y_2O_3$, $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Tb_2O_3$, $Th_4O_7$, $Tm_2O_3$, $Yb_2O_3$, MgO, $TiO_2$, $Cr_2O_3$, CuO, $ZrO_2$, SrO, $LiO_2$, NiO, $Fe_2O_3$, and combinations thereof). Optionally, the method further comprises heat-treating the glass article to convert at least a portion of the glass to crystalline ceramic and provide a glass-ceramic article.

In one exemplary method according to the present invention for making an article, the method comprises:

feeding at least $Al_2O_3$ source and $SiO_2$ source into one of a flame or a plasma to provide a melt, wherein the $SiO_2$ source is at least one of polymeric $SiO_2$ source or organometallic $SiO_2$ source;

cooling the melt to provide glass beads, wherein the glass comprises at least 35 (in some embodiments, at least 40, 45, 50, 55, 60, 65, 70, 75, 80, 85, or even at least 90) percent by weight $Al_2O_3$ and $SiO_2$ in a range from 0.5 to 10 (in some embodiments, 0.5 to 5 or 1 to 3) percent by weight, and not more than 10 (in some embodiments, not more than 9, 8, 7, 6, 5, 4, 3, 2, 1, 0.5, 0.1, or even zero) percent by weight collectively $As_2O_3$, $B_2O_3$, $GeO_2$, $P_2O_5$, $SiO_2$, $TeO_2$, and $V_2O_5$, based on the total weight of the glass, the glass having a $T_g$;

crushing the glass beads to provide glass powder;

heating the glass powder above the $T_g$ such that the glass powder coalesces to form a shape;

cooling the coalesced shape to provide a glass article. Optionally, the glass further comprises at least one metal oxide other than $Al_2O_3$ and $SiO_2$ (e.g., $Y_2O_3$, $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Tb_2O_3$, $Th_4O_7$, $Tm_2O_3$, $Yb_2O_3$, MgO, $TiO_2$, $Cr_2O_3$, CuO, $ZrO_2$, SrO, $LiO_2$, NiO, $Fe_2O_3$, and combinations thereof). Optionally, the method further comprises heat-treating the glass article to convert at least a portion of the glass to crystalline ceramic and provide a glass-ceramic article.

Some embodiments of glass-ceramics according to the present invention may comprise glass in an amount, for example, of at least 1, 2, 3, 5, 10, 15, 20, 25, 30, 35, 40, 45, 50, 55, 60, 65, 70, 75, 80, 85, 90, 95, or even 100 percent by volume, based on the total volume of the glass-ceramic. Some embodiments of glass-ceramics according to the present invention may comprise crystalline ceramic in an amount, for example, of at least 1, 2, 3, 5, 10, 15, 20, 25, 30, 35, 40, 45, 50, 55, 60, 65, 70, 75, 80, 85, 90, 95, 97, 98, 99, or even 100 percent by volume, based on the total volume of the glass-ceramic.

In this application:

"amorphous material" refers to material derived from a melt and/or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes glass, crystalline ceramic, glass-ceramic, and combinations thereof;

"complex metal oxide" refers to a metal oxide comprising two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$.metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3.Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3$.REO" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramic comprising crystals formed by heat-treating glass;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium oxide (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium oxide (e.g., $Tb_2O_3$), thorium oxide (e.g., $Th_4O_7$), thulium oxide (e.g., $Tm_2O_3$), and ytterbium oxide (e.g., $Yb_2O_3$), and combinations thereof; and "REO" refers to rare earth oxide(s).

Further, it is understood herein that unless it is stated that a metal oxide (e.g., $Al_2O_3$, complex $Al_2O_3$.metal oxide, etc.) is crystalline, for example, in a glass-ceramic, it may be crystalline, or portions glass and portions crystalline. For example if a glass-ceramic comprises $Al_2O_3$ and $ZrO_2$, the $Al_2O_3$ and $ZrO_2$ may each be in a glass state, crystalline state, or portions in a glass state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3$.metal oxides).

Some embodiments of glasses and glass-ceramics made according to the present invention can be made, formed as, or converted into beads (e.g., beads having diameters of at least 1 micrometer, 5 micrometers, 10 micrometers, 25 micrometers, 50 micrometers, 100 micrometers, 150 micrometers, 250 micrometers, 500 micrometers, 750 micrometers, 1 mm, 5 mm, or even at least 10 mm), articles (e.g., plates), fibers, particles, and coatings (e.g., thin coatings). Embodiments of the beads can be useful, for example, in reflective devices such as retro-reflective sheeting, alphanumeric plates, and pavement markings. Embodiments of the particles and fibers are useful, for example, as thermal insulation, filler, or reinforcing material in composites (e.g., ceramic, metal, or polymeric matrix composites). Embodiments of the thin coatings can be useful, for example, as protective coatings in applications involving wear, as well as for thermal management. Examples of articles made according to the present invention include kitchenware (e.g., plates), dental brackets, and reinforcing material (e.g., particles and fibers), cutting tool inserts, abrasive materials, and structural components of gas engines, (e.g., valves and bearings). Exemplary embodiments of other articles include those having a protective coating of glass-ceramic on the outer surface of a body or other substrate. Certain glass-ceramic particles made according to the present invention can be particularly useful as abrasive particles. The abrasive particles can be incorporated into an abrasive article, or used in loose form.

Abrasive particles are usually graded to a given particle size distribution before use. Such distributions typically have a range of particle sizes, from coarse particles to fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles made according to the present invention. In some embodiments, at least 5, 10, 15, 20, 25, 30, 35, 40, 45, 50 55, 60, 65, 70, 75, 80, 85, 90, 95, or even 100 percent by weight of the plurality of abrasive particles are the abrasive particles made according to the present invention, based on the total weight of the plurality of abrasive particles.

In another aspect, the present invention provides abrasive particles comprising a glass-ceramic made according to the present invention (including glass-ceramic abrasive particles). The present invention also provides a plurality of abrasive particles having a specified nominal grade, wherein at least a portion of the plurality of abrasive particles are abrasive particle made according to the present invention. In another aspect, the present invention provides an abrasive article (e.g., a bonded abrasive article, a non-woven abrasive article, or a coated abrasive article) comprising a binder and a plurality of abrasive particles, wherein at least a portion of the abrasive particles are the abrasive particles made according to the present invention.

Abrasive articles according to the present invention comprise binder and a plurality of abrasive particles, wherein at least a portion of the abrasive particles are the abrasive particles made according to the present invention. Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments, at least 5, 10, 15, 20, 25, 30, 35, 40, 45, 50 55, 60, 65, 70, 75, 80, 85, 90, 95, or even 100 percent by weight of the abrasive particles in an abrasive article are the abrasive particles made according to the present invention, based on the total weight of the abrasive particles in the abrasive article.

The present invention also provides a method of abrading a surface, the method comprising:
  contacting abrasive particles made according to the present invention with a surface of a workpiece; and
  moving at least one of the abrasive particles made according to the present invention or the contacted surface to abrade at least a portion of the surface with at least one of the abrasive particles made according to the present invention.

DETAILED DESCRIPTION

Figure 1:
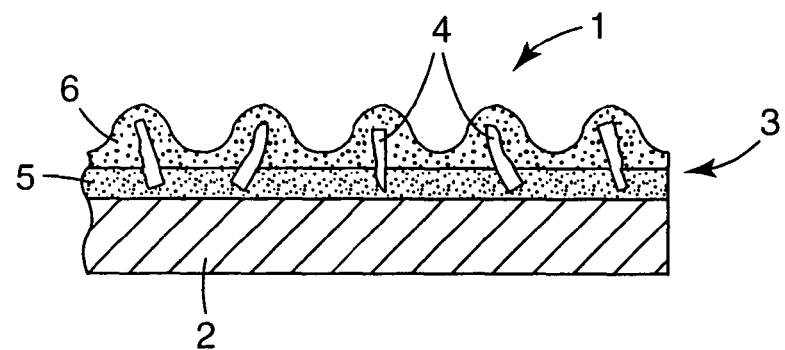
FIG. 1 is a fragmentary cross-sectional schematic view of a coated abrasive article including abrasive particles according to the present invention.

The present invention pertains to methods of making glasses and glass-ceramics comprising $Al_2O_3$ and $SiO_2$, wherein the methods utilize at least one of polymeric $SiO_2$ source or oganometallic $SiO_2$ source. The glasses are prepared by selecting the raw materials for the desired composition, and the processing technique(s).

Some embodiments of glasses and glass-ceramics made according to the present invention have x, y, and z dimensions each perpendicular to each other, and wherein each of the x, y, and z dimensions is at least 1, 5, 10, 25 micrometers (in some embodiments, at least at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 5 mm, or even at least 10 mm).

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$.metal oxides (e.g., $Dy_3Al_5O_{12}$, $Y_3Al_5O_{12}$, $CeAl_{11}O_{18}$, etc.)).

"Polymeric $SiO_2$ Source" refers to compounds comprising repeating silicon containing structural units (e.g., per molecule, such as silanes, and silicones), wherein the structural units may be linear or branched chain. Polymeric $SiO_2$ sources include silica materials derived from a sol-gel (i.e., silica gels, or condensation products of alkoxides) process. Exemplary commercially available polymeric $SiO_2$ sources include silanes, silica sols and gels, silicones, and silicone oils.

"Organometallic $SiO_2$ Source" refers to a compounds comprising Si and at least one organic functional group (e.g., an alkoxy, or an alkyl, alkenyl, amine, amide, or carboxyl) bonded thereto, and include silicon compounds comprising halogens (e.g., silicon tetrachloride). Exemplary commercially available organometallic $SiO_2$ sources include silicon alkoxides, silicon acetate, silicon tetrachloride, and silicotungstic acid.

Typically, at least 50 percent (in some embodiments, at least 55, 60, 65, 70, 75, 80, 85, 90, 95, or even 100 percent) by weight of the $SiO_2$ present in the resulting glass is derived from the polymeric and/or organometallic $SiO_2$ source.

Sources, including commercial sources, of particulate $SiO_2$ include fumed silicas, fused silicas, sand, silica sols, silica gels, silicate minerals (e.g., talc), sodium silicate, ores, and silicon).

In some embodiments, the polymeric and/or organometallic $SiO_2$ sources may be in a solid form (e.g., particulate or bulk). The solid polymeric and/or organometallic $SiO_2$ sources may be dissolved, dispersed, and/or reacted with or in a liquid (e.g., water, or organic solvents such as IPA, acetone etc.). Liquids for dissolving or dispersing the polymeric and/or organometallic $SiO_2$ sources are liquids that are compatible solvents relative to the particular the polymeric and/or organometallic $SiO_2$ source. If the solid polymeric and/or organometallic $SiO_2$ sources are to be used in particulate form, in some embodiments, the particles have an average particle size in a range from 5 nm to 50 micrometers (in some embodiments, in a range from 10 nm to 20 micrometers, or even 15 nm to 1 micrometer), wherein at least 90 (in some embodiments, 95, or even 100) percent by weight of such particulate source is in a range from 5 nm to 50 micrometers (or 10 nm to 20 micrometers, or 15 nm to 1 micrometer, respectively).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxide.other metal oxides (e.g., $Dy_3Al_5O_{12}$, $CeAl_{11}O_{18}$, etc.)).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$)).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

For embodiments comprising $ZrO_2$ and $HfO_2$, the weight ratio of $ZrO_2$:$HfO_2$ may be in a range of 1:zero (i.e., all $ZrO_2$; no $HfO_2$) to zero:1, as well as, for example, at least about 99, 98, 97, 96, 95, 90, 85, 80, 75, 70, 65, 60, 55, 50, 45, 40, 35, 30, 25, 20, 15, 10, and 5 parts (by weight) $ZrO_2$ and a corresponding amount of $HfO_2$ (e.g., at least about 99 parts (by weight) $ZrO_2$ and not greater than about 1 part $HfO_2$) and at least about 99, 98, 97, 96, 95, 90, 85, 80, 75, 70, 65, 60, 55, 50, 45, 40, 35, 30, 25, 20, 20, 15, 10, and 5 parts $HfO_2$ and a corresponding amount of $ZrO_2$.

Sources, including commercial sources, of other metal oxides (e.g., BaO, CaO, $Cr_2O_3$, CuO, CoO, $Fe_2O_3$, $GeO_2$, $HfO_2$, $Li_2O$, MgO, MnO, NiO, $Na_2O$, $Sc_2O_3$, SrO, $TiO_2$, ZnO, $ZrO_2$, and combinations thereof) which may be incorporated into the glasses or glass-ceramics include the oxides themselves, metal powders, complex oxides, ores, carbonates, acetates, nitrates, chlorides, hydroxides, etc.

In some embodiments, it may be advantageous for at least a portion of a metal oxide source (in some embodiments, 10, 15, 20, 25, 30, 35, 40, 45, 50, 55, 60, 65, 70, 75, 80, 85, 90, 95, or even 100 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise combining them with the other raw materials. Although not wanting to be bound by theory, it is believed that the heat resulting from the exothermic reaction associated with the oxidation of the metal is beneficial in the formation of a homogeneous melt and resulting glass. For example, it is believed that the additional heat generated by the oxidation reaction within the raw material eliminates, minimizes, or at least reduces insufficient heat transfer, and hence facilitates formation and homogeneity of the melt, particularly when forming glass particles with x, y, and z dimensions over 50 (over 100, or even over 150) micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or not practical due to high melting point of the materials. Further, the presence of the additional heat generated by the oxidation reaction actually enables the formation of glass that otherwise could not be made, or could not be made in the desired size range. Another advantage of the invention include, in forming the glasses, that many of the chemical and physical processes such as melting, densification and spherodizing can be achieved in a short time, so that very high quench rates may be achieved. For additional details, see co-pending application having U.S. Ser. No. 10/211,639, filed Aug. 2, 2002, the disclosure of which is incorporated herein by reference.

In general, the metal oxide sources are fed into a flame to form a melt, desirably a homogenous melt, and then rapidly cooling the melt to provide glass.

Known techniques for combining such types of raw materials, desirably, to provide a substantially homogeneous mixture can be used. Alternatively, or in addition, the particle size of particulate raw materials can be reduced using known techniques. Examples of such techniques for combining raw materials together and reducing the particle size of particulate material include ball milling, mixing, tumbling and the like. The milling media in the ball mill may be metal balls, ceramic balls and the like. The ceramic milling media may be, for example, alumina, zirconia, silica, magnesia and the like. The ball milling may occur dry, in an aqueous environment, or in a solvent-based (e.g., isopropyl alcohol) environment. If the raw material batch contains metal powders and/or organometallic sources, then it is generally desired to use a solvent during milling. This solvent may be any suitable material with the appropriate flash point and ability to disperse or dissolve the raw materials. The milling time may be from a few minutes to a few days, generally between a few hours to 24 hours. When an organometallic (e.g., silicon alkoxide or silicon tetrachloride) metal oxide source is used, it may be desirable to partially hydrolyze the organometallic source in to an oxide precursor. Such hydrolysis may take place, for example, by controlled exposure to water or moisture during milling, drying or even during flame or plasma formation of the melt. In a wet or solvent based milling system, the liquid medium is removed, typically by drying, so that the resulting mixture is typically homogeneous and substantially devoid of the water and/or solvent. If a solvent based milling system is, during drying, a solvent recovery system may be employed to recycle the solvent. After drying, the resulting mixture may be in the form of a "dried cake". This cake like mixture may then be broken up or crushed into the desired particle size prior to melting. Alternatively, for example, spray-drying techniques may be used. The latter typically provides spherical particulates of a desired oxide mixture. The precursor material may also be prepared by wet chemical methods including precipitation and sol-gel. Such methods will be beneficial if extremely high levels of homogeneity are desired.

In some embodiments of methods according to the present invention, the organometallic and/or the polymeric $SiO_2$ source may act as a binder for the feed particles. In such cases, the polymeric or organometallic $SiO_2$ source may improve the mechanical integrity of the feed particles. The amount of such $SiO_2$ sources may depend, for example, on the particle size and/or surface area, as well as, for example, the desired strength and/or chemical composition of the resulting glass or glass-ceramics. In some embodiments, such $SiO_2$ source range from 0.5 to 5, 0.5 to 1.5, or even 0.5 to 1 percent by weight.

It is also within the scope of the present invention to partially hydrolyze, or partially pyrolize the organometallic or polymeric $SiO_2$.

Particulate raw materials are typically selected to have particle sizes such that the formation of a homogeneous melt can be achieved rapidly. Typically, raw materials with relatively small average particles size and narrow distributions are used for this purpose. It may be desirable for the particulate raw materials to be provided in a range of particle sizes. Although not wanting to be bound by theory, it is believed that this maximizes the packing density and strength of the feed particles. If the raw material powders are too coarse, the feed and resulting melt particles may not have the desired composition or the uniformity. In general the coarsest raw material particles are smaller than the desired melt or glass particle sizes. Further, raw material particles that are too coarse, tend to produce thermal and mechanical stresses in the feed particles, for example, during a flame forming or plasma spraying step. The end result in such cases is generally, fracturing of the feed particles in to smaller fragments, loss of compositional uniformity, loss of yield in desired glass particle sizes, or even incomplete melting as the fragments generally change their trajectories in a multitude of directions out of the heat source. Further, if the raw material powders are too small, they tend to be difficult and costly to handle.

The feed particles (made up of particulate raw materials) fed into the flame or plasma, typically have a particle size less than 250, 200, 150, or even less than 100 micrometers. In embodiments utilizing particulate $SiO_2$ source(s) typically have an average particle size in a range from 5 nm to 50 micrometers (in some embodiments, in a range from 10 nm to 20 micrometers, or even 15 nm to 1 micrometer), wherein at least 90 (in some embodiments, 95, or even 100) percent by weight of the particulate $SiO_2$ source is in a range from 5 nm to 50 micrometers (or 10 nm to 20 micrometers, or 15 nm to 1 micrometer, respectively).

The glass is typically obtained by relatively rapidly cooling the molten material (i.e., the melt). The quench rate (i.e., the cooling time) to obtain the glass depends upon many factors, including the chemical composition of the melt, the glass-forming ability of the components, the thermal properties of the melt and the resulting glass, the processing technique(s), the dimensions and mass of the resulting glass, and the cooling technique. In general, relatively higher quench rates are required to form glasses comprising higher amounts of $Al_2O_3$ (i.e., greater than 75 percent by weight $Al_2O_3$), especially in the absence of known glass formers such as $SiO_2$, $B_2O_3$, $P_2O_5$, $GeO_2$, $TeO_2$, $As_2O_3$, and $V_2O_5$. Similarly, it is more difficult to cool melts into glasses in larger dimensions, as it is more difficult to remove heat fast enough.

The quench rates achieved in making glasses according to the methods of the present invention are believed to be higher than $10^3$, $10^4$, $10^5$, or even $10^{6\circ}$ C./sec (i.e., a temperature drop of 1000° C. from a molten state in less than a second, less than a tenth of a second, less than a hundredth of a second or even less than a thousandth of a second, respectively). Techniques for cooling the melt include discharging the melt into a cooling media (e.g., high velocity air jets, liquids (e.g., cold water), metal plates (including chilled metal plates), metal rolls (including chilled metal rolls), metal balls (including chilled metal balls), and the like). Other cooling techniques known in the art include roll-chilling. Roll-chilling can be carried out, for example, by melting the metal oxide sources at a temperature typically 20–200° C. higher than the melting point, and cooling/quenching the melt by spraying it under high pressure (e.g., using a gas such as air, argon, nitrogen or the like) onto a high-speed rotary roll(s). Typically, the rolls are made of metal and are water-cooled. Metal book molds may also be useful for cooling/quenching the melt.

The cooling rate is believed to affect the properties of the quenched glass. For instance, glass transition temperature, density and other properties of glass typically change with cooling rates.

Rapid cooling may also be conducted under controlled atmospheres, such as a reducing, neutral, or oxidizing environment to maintain and/or influence the desired oxidation states, etc. during cooling. The atmosphere can also influence glass formation by influencing crystallization kinetics from undercooled liquid. For example, larger undercooling of $Al_2O_3$ melts without crystallization has been reported in argon atmosphere as compared to that in air.

In one technique for forming a melt using a flame, the metal oxide sources are fed (e.g., in the form of particles, sometimes referred to as "feed particles") directly into a burner (e.g., a methane-air burner, an acetylene-oxygen burner, a hydrogen-oxygen burner, and like), and then quenched, for example, in water, cooling oil, air, or the like.

Feed particles can be formed, for example, by grinding, agglomerating (e.g., spray-drying), melting, or sintering the metal oxide sources. Additional details regarding melt formation using a flame can be found, for example, in U.S. Pat. No. 6,254,981 (Castle).

Any of a variety of plasma spraying techniques may be suitable, including many known in the art. An exemplary plasma spray apparatus is diagrammatically illustrated in FIG. 4, wherein plasma spray apparatus 400 includes plasma spray gun 401 generally, is adapted to generate plasma gas jet 416 substantially symmetric about jet axis 417. Plasma gas jet 416 contains metal oxide droplets 407.

Plasma spray gun 401 includes housing 403 having nozzle 402 located therein. Nozzle 402 forms nozzle bore 405 adapted to direct and focus plasma gas jet 416 in a delivery direction 418. To produce plasma gas jet 416, plasma spray gun 401 includes various electrodes. For example, in the illustrated embodiment of FIG. 4, first electrode 404 is located proximate an entrance to nozzle 402 and is configured as a cathode (e.g., connected to a negative terminal of a power supply (not shown)). Nozzle 402 may itself form second electrode 402' configured as an anode (e.g., connected to a positive terminal of the power supply). While the actual materials used to form first and second electrodes 404 and 402' may vary, one exemplary embodiment of plasma spray gun 401 utilizes first electrode 404 made from tungsten or tungsten alloy and second electrode 402' (nozzle 402) made from copper or copper alloy.

Those of skill in the art will realize that this electrode configuration is merely exemplary and that other electrode configurations are certainly possible. For example, the polarity and/or material of the first and second electrodes may be different that that described above. Alternatively, for example, second electrode 402' may be independent of nozzle 402. In fact, most any electrode configuration that yields an acceptable plasma spray is possible without departing from the scope of the invention.

Arc gas inlet 414 may be provided to allow for the introduction of arc gas 410 into gas chamber 412 of housing 403. While most any gas complimentary to arc formation is potentially suitable, preferred arc gases include argon, helium, hydrogen, nitrogen, and combinations thereof.

One or more carrier conduits 420 may be formed in housing 403. As further described below, carrier conduits 420 may deliver particles 430 to plasma gas jet 416. While the actual geometry of carrier conduits 420 may vary, they are, in one embodiment, formed by holes drilled to intersect nozzle bore 405. In the illustrated embodiment, each carrier conduit 420 intersects bore 405 at or proximate the smallest diameter of bore 405.

One or more carrier conduits 420 are each preferably symmetric about conduit axis 422. Each conduit axis 422 may intersect jet axis 417 at angle 424 of 75 degrees or less, wherein one or more carrier conduits 420 diverge or extend away from jet axis 417 in delivery direction 418. In some embodiments, angle 424 is preferably 45 degrees to 75 degrees, and more preferably, 60 degrees to 75 degrees.

Other configurations of carrier conduits 420 are also possible without departing from the scope of the invention. For example, conduits 420 may have other (e.g., non-linear) shapes, or they may penetrate bore 405 at a point offset from its centerline. These and other conduit configurations are certainly possible if they are operable to direct particles within conduit 420 to plasma gas jet 416 along particle delivery vector 426, where: particle delivery vector 426 intersects jet axis 417 at angle 424 of 75 degrees or less; and the particle delivery vector 426 comprises vector component 426' having a direction that is substantially opposite delivery direction 418. Once again, in some embodiments, angle 424 is preferably 45 degrees to 75 degrees, and more preferably, 60 degrees to 75 degrees.

Although the term "intersects" is used herein, those of skill in the art will realize that conduit axis 422 may not necessarily be coplanar with jet axis 417 (e.g., one may be skewed with respect to the other). In these instances, it is understood that "intersects" indicates angle 424 between the two axes when the axes are moved parallel to themselves to a common point of intersection.

Having described plasma gas jet 401 in detail, operation of the same in accordance with an exemplary embodiment of the present invention is now described.

Arc gas 410 may be introduced into chamber 412 and accelerated through converging bore 405 of nozzle 402 as described above. When first electrode 404 and second electrode 402' are coupled to respective terminals of a power supply, an electric field is created between first electrode 404 and nozzle 402. The resulting plasma gas jet 416 exits housing 403 in delivery direction 418 along jet axis 417, the latter which is substantially parallel and coaxial to axis 406 of nozzle 402. A cooling system, represented by arrows 408 in FIG. 4, may be activated to maintain the temperature of housing 403 at the desired levels.

To generate the desired spray of droplets 407, particles 430 are delivered to the plasma gas jet 416 through carrier conduits 420. In one embodiment, the particles 430 are entrained in a carrier gas that travels through carrier conduits 420 toward the nozzle bore 405. While nitrogen is preferred, other carrier gases may be used. When the metal oxide particles 430 reach plasma gas jet 416, at least a portion are at least partially liquefied to form the desired droplets 407. Droplets 407 may then be cooled and deposited on a substrate or otherwise collected.

By orienting carrier conduits 420 as shown and described herein, particles 430 achieve increased residence time within plasma gas jet 416. This longer residence time allows for the production of courser droplets 407 when compared to droplets produced by existing apparatus and methods.

Further with regard to generating a plasma and melting the raw materials (typically in the form of feed particles) a variety of DC, AC, RF plasma processing systems can be used. Suitable plasma systems useful for the invention typically have about 40 kW of power although smaller or larger systems may be useful depending, for example, on the production demands.

Gases for generating the plasma include those known in the art such as argon, helium, nitrogen, hydrogen, and mixtures thereof. Most commonly, argon gas is used as the plasma gas, but to increase the enthalpy (i.e., the heat content of the plasma, one or more of helium, hydrogen, or nitrogen) may also be added.

The raw materials (typically in the form of feed particles) are commonly introduced into the plasma by a carrier gas. Gases for delivering the raw materials to the plasma gas jet include argon, helium, nitrogen, and mixtures thereof. The carrier gas may be same as the plasma gas (i.e., argon) or it may provide the second or the third gas to modify the energetics of the plasma. The larger plasma jet size is beneficial, for example, because it tends to increase residence time of the raw materials in the plasma jet, and thus enhanced, often desirable heat transfer to the raw materials, which in turn tends to lead to more complete and homogeneous melt formation, and a denser and stronger plasma sprayed material. It is also possible, for example, to introduce the fed into the plasma along the axis of the plasma jet, for example, in the particulate form or as a feed stick (the feed material is formed in to a rod shape and is fed into the plasma slowly as the tip of the rod is molten and broken into droplets, which are then sprayed by the plasma jet.

In some embodiments, the raw materials can be introduced into the plasma just outside of the gun. Although not wanting to be bound by theory, it is believed that feeding the raw materials into the plasma through an orifice machined in the anode of the plasma gun desirably increases the residence time or the interaction of the particles in the plasma. In another aspect, some cases, although not wanting to be bound by theory, it is believed that the residence time or the interaction of the raw materials in the plasma may be desirably changed (e.g., increased) by orienting the orifice towards the front or back of the gun at an angle (e.g., at least 10, 20 or 30 degrees, etc.).

In another aspect of the invention, the plasma processing may be carried out in air, in a blanket of gasses, at higher or lower pressures, even under vacuum.

The melt from the plasma is typically sprayed onto a substrate or into a liquid (e.g., water), although the liquid may also be on a substrate. The substrate or liquid aid in cooling the melt. In some cases, it is desirable to provide a coating onto a substrate. In other cases, the substrate may be merely serving to cool and collect material which is subsequently removed from the substrate (e.g., bulk material is provided). It is understood that then substrate is selected to be of sufficient integrity to withstand the heat from the plasma. Common substrate materials are metals and ceramics. With regard to using liquid to cool the plasma sprayed melt, the result is typically particulate, most commonly in the form of spheres or beads (e.g., in some embodiments having a diameter(s) in a range from about 1 to at least 150 micrometers).

For additional details regarding plasma spraying, see, for example, co-pending application having U.S. Ser. No. 10/211,640, filed Aug. 2, 2002, the disclosure of which is incorporated herein by reference.

Typically, glasses and glass-ceramics made according to the present invention have x, y, and z dimensions each perpendicular to each other, and wherein each of the x, y, and z dimensions is at least 10 micrometers. In some embodiments, the x, y, and z dimensions is at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 5 mm, or even at least 10 mm, if coalesced. The x, y, and z dimensions of a material are determined either visually or using microscopy, depending on the magnitude of the dimensions. The reported z dimension is, for example, the diameter of a sphere, the thickness of a coating, or the shortest dimension of a prismatic shape.

The addition of certain metal oxides may alter the properties and/or crystalline structure or microstructure of ceramics made according to the present invention, as well as the processing of the raw materials and intermediates in making the ceramic. For example, oxide additions such as CaO, $Li_2O$, MgO, and $Na_2O$ have been observed to alter both the $T_g$ and $T_x$ (wherein $T_x$ is the crystallization temperature) of glass. Although not wishing to be bound by theory, it is believed that such additions influence glass formation. Further, for example, such oxide additions may decrease the melting temperature of the overall system (i.e., drive the system toward lower melting eutectic), and ease glass-formation. Complex eutectics in multi component systems (quaternary, etc.) may result in better glass-forming ability. The viscosity of the liquid melt and viscosity of the glass in its' working range may also be affected by the addition of metal oxides other than the particular required oxide(s).

Crystallization of glasses to form glass-ceramics may also be affected by the additions of materials. For example, certain metals, metal oxides (e.g., titanates and zirconates), and fluorides may act as nucleation agents resulting in beneficial heterogeneous nucleation of crystals. Also, addition of some oxides may change the nature of metastable phases devitrifying from the glass upon reheating. In another aspect, for ceramics made according to the present invention comprising crystalline $ZrO_2$, it may be desirable to add metal oxides (e.g., $Y_2O_3$, $TiO_2$, $CeO_2$, CaO, and MgO) that are known to stabilize the tetragonal/cubic form of $ZrO_2$.

The particular selection of metal oxide sources and other additives for making glasses and glass-ceramics described herein typically takes into account, for example, the desired composition, the microstructure, the degree of crystallinity, the physical properties (e.g., hardness or toughness), the presence of undesirable impurities, and the desired or required characteristics of the particular process (including equipment and any purification of the raw materials before and/or during fusion and/or solidification) being used to prepare the ceramics.

In some instances, it may be preferred to incorporate limited amounts of metal oxides selected from the group consisting of: $B_2O_3$, $Na_2O$, $P_2O_5$, $SiO_2$, $TeO_2$, $V_2O_3$, and combinations thereof. Sources, including commercial sources, include the oxides themselves, complex oxides, elemental (e.g., Si) powders, ores, carbonates, acetates, nitrates, chlorides, hydroxides, etc. These metal oxides may be added, for example, to modify a physical property of the resulting glass-ceramic and/or improve processing. These metal oxides, when used, are typically added from greater than 0 to 20% by weight collectively (in some embodiments, greater than 0 to 10 (in some embodiments, greater than 0 to 5%) by weight collectively, or even greater than 0 to 2% by weight collectively) of the glass-ceramic depending, for example, upon the desired property.

The microstructure or phase composition (glassy/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

A percent amorphous (or glass) yield can be calculated for particles (e.g., beads), etc. using a −100+120 mesh size fraction (i.e., the fraction collected between 150-micrometer opening size and 125-micrometer opening size screens). The measurements are done in the following manner. A single layer of particles, beads, etc. is spread out upon a glass slide. The particles, beads, etc. are observed using an optical microscope. Using the crosshairs in the optical microscope eyepiece as a guide, particles, beads, etc. that lay along a straight line are counted either amorphous or crystalline depending on their optical clarity. A total of 500 particles, beads, etc. are typically counted, although fewer particles, beads, etc. may be used and a percent amorphous yield is determined by the amount of amorphous particles, beads, etc. divided by total particles, beads, etc. counted. Embodiments of methods according to the have percent amorphous (or glass) yields of at least 50, 60, 70, 75, 80, 85, 90, 95, or even 100 percent.

If it is desired for all the particles to be amorphous (or glass), and the resulting yield is less than 100%, the amorphous (or glass) particles may be separated from the non-amorphous (or non-glass) particles. Such separation may be done, for example, by any conventional techniques, including separating based upon density or optical clarity.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, XRD can be used qualitatively to determine types of phases. The presence of a broad diffused intensity peak is taken as an indication of the amorphous nature of a material. The existence of both a broad peak and well-defined peaks is taken as an indication of existence of crystalline matter within a glass matrix.

The initially formed glass may be larger in size than that desired. If the glass is in a desired geometric shape and/or size, size reduction is typically not needed. The glass or glass-ceramic can be converted into smaller pieces using crushing and/or comminuting techniques known in the art, including roll crushing, jaw crushing, hammer milling, ball milling, jet milling, impact crushing, and the like. In some instances, it is desired to have two or multiple crushing steps. For example, after the ceramic is formed (solidified), it may be in the form of larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are not of the desired size may be re-crushed if they are too large, or "recycled" and used as a raw material for re-melting if they are too small.

The shape of particles can depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. For some particles an average aspect ratio ranging from 1:1 to 5:1 is typically desired, and in some embodiments, 1.25:1 to 3:1, or even 1.5:1 to 2.5:1.

It is also within the scope of the present invention, for example, to directly form articles in desired shapes. For example, desired articles may be formed (including molded) by pouring or forming the melt into a mold. Also see, for example, the forming techniques described in application having U.S. Ser. No. 10/358,772, filed Feb. 5, 2003, the disclosure of which is incorporated herein by reference.

Embodiments of ceramics made according to the present invention can be obtained without limitations in dimensions. This was found to be possible through a coalescing step performed at temperatures above glass transition temperature. This coalescing step in essence forms a larger sized body from two or more smaller particles. For instance, as evident from FIG. 5, glass made according to the present invention undergoes glass transition ($T_g$) before significant crystallization occurs ($T_x$) as evidenced by the existence of an endotherm ($T_g$) at lower temperature than an exotherm ($T_x$). For example, ceramic (including glass prior to crystallization), may also be provided by heating, for example, particles comprising the glass, and/or fibers, etc. above the $T_g$ such that the particles, etc. coalesce to form a shape and cooling the coalesced shape. The temperature and pressure used for coalescing may depend, for example, upon composition of the glass and the desired density of the resulting material. The temperature should be greater than the glass transition temperature. In certain embodiments, the heating is conducted at at least one temperature in a range of about 850° C. to about 1100° C. (in some embodiments, 900° C. to 1000° C.). Typically, the glass is under pressure (e.g., greater than zero to 1 GPa or more) during coalescence to aid the coalescence of the glass. In one embodiment, a charge of the particles, etc. is placed into a die and hot-pressing is performed at temperatures above glass transition where viscous flow of glass leads to coalescence into a relatively large part. Examples of typical coalescing techniques include hot pressing, hot isostatic pressing, hot extrusion, hot forging and the like (e.g., sintering, plasma assisted sintering). For example, particles comprising glass (obtained, for example, by crushing) (including beads and microspheres), fibers, etc. may formed into a larger particle size. Coalescing may also result in a body shaped into a desired form (e.g., a geometric shape). In some embodiments, the shaped body is a rod having an aspect ratio greater than 1:1, or even greater than 2:1. Typically, it is generally desirable to cool the resulting coalesced body before further heat treatment. After heat treatment if so desired, the coalesced body may be crushed to smaller particle sizes or a desired particle size distribution.

In general, heat-treatment can be carried out in any of a variety of ways, including those known in the art for heat-treating glass to provide glass-ceramics. For example, heat-treatment can be conducted in batches, for example, using resistively, inductively or gas heated furnaces. Alternatively, for example, heat-treatment (or a portion thereof) can be conducted continuously, for example, using a rotary kiln, fluidized bed furnaces, or pendulum kiln. In the case of a rotary kiln or a pendulum kiln, the material is typically fed directly into the kiln operating at the elevated temperature. In the case of a fluidized bed furnace, the glass to be heat-treated is typically suspended in a gas (e.g., air, inert, or reducing gasses). The time at the elevated temperature may range from a few seconds (in some embodiments, even less than 5 seconds) to a few minutes to several hours. The temperature typically ranges from the $T_x$ of the glass to 1600° C., more typically from 900° C. to 1600° C., and in some embodiments, from 1200° C. to 1500° C. It is also within the scope of the present invention to perform some of the heat-treatment in multiple steps (e.g., one for nucleation, and another for crystal growth; wherein densification also typically occurs during the crystal growth step). When a multiple step heat-treatment is carried out, it is typically desired to control either or both the nucleation and the crystal growth rates. In general, during most ceramic processing operations, it is desired to obtain maximum densification without significant crystal growth. Although not wanting to be bound by theory, in general, it is believed in the ceramic art that larger crystal sizes lead to reduced mechanical properties while finer average crystallite sizes lead to improved mechanical properties (e.g., higher strength and higher hardness). In particular, it is very desirable to form ceramics with densities of at least 90, 95, 97, 98, 99, or even at least 100 percent of theoretical density, wherein the average crystal sizes are less than 0.15 micrometer, or even less than 0.1 micrometer.

In some embodiments of the present invention, the glasses or ceramics comprising glass may be annealed prior to heat-treatment. In such cases annealing is typically done at a temperature less than the $T_x$ of the glass for a time from a few second to few hours or even days. Typically, the annealing is done for a period of less than 3 hours, or even less than an hour. Optionally, annealing may also be carried out in atmospheres other than air. Furthermore, different stages (i.e., the nucleation step and the crystal growth step) of the heat-treatment may be carried out under different atmospheres. It is believed that the $T_g$ and $T_x$, as well as the $T_x$-$T_g$ of glasses according to this invention may shift depending on the atmospheres used during the heat treatment.

One skilled in the art can determine the appropriate conditions from a Time-Temperature-Transformation (TTT) study of the glass using techniques known in the art. One skilled in the art, after reading the disclosure of the present invention should be able to provide TTT curves for glasses used to make glass-ceramics according to the present invention, determine the appropriate nucleation and/or crystal growth conditions to provide glass-ceramics according to the present invention.

Heat-treatment may occur, for example, by feeding the material directly into a furnace at the elevated temperature. Alternatively, for example, the material may be fed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for, example, it may be desirable to heat-treat under gas pressure as in, for example, hot-isostatic press, or in gas pressure furnace. Although not wanting to be bound by theory, it is believed that atmospheres may affect oxidation states of some of the components of the glasses and glass-ceramics. Such variation in oxidation state can bring about varying coloration of glasses and glass-ceramics. In addition, nucleation and crystallization steps can be affected by atmospheres (e.g., the atmosphere may affect the atomic mobilities of some species of the glasses).

It is also within the scope of the present invention to conduct additional heat-treatment to further improve desirable properties of the material. For example, hot-isostatic pressing may be conducted (e.g., at temperatures from about 900° C. to about 1400° C.) to remove residual porosity, increasing the density of the material.

It is within the scope of the present invention to convert (e.g., crush) the resulting article or heat-treated article to provide particles (e.g., abrasive particles according to the present invention).

Typically, glass-ceramics are stronger than the glasses from which they are formed. Hence, the strength of the material may be adjusted, for example, by the degree to which the glass is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example, *Glass-Ceramics*, P. W. McMillan, Academic Press, Inc., 2nd edition, 1979.

As compared to many other types of ceramic processing (e.g., sintering of a calcined material to a dense, sintered ceramic material), there is relatively little shrinkage (typically, less than 30 percent by volume; in some embodiments, less than 20 percent, 10 percent, 5 percent, or even less than 3 percent by volume) during crystallization of the glass to form the glass-ceramic. The actual amount of shrinkage depends, for example, on the composition of the glass, the heat-treatment time, the heat-treatment temperature, the heat-treatment pressure, the density of the glass being crystallized, the relative amount(s) of the crystalline phases formed, and the degree of crystallization. The amount of shrinkage can be measured by conventional techniques known in the art, including by dilatometry, Archimedes method, or measuring the dimensions of the material before and after heat-treatment. In some cases, there may be some evolution of volatile species during heat-treatment.

In some embodiments, the relatively low shrinkage feature may be particularly advantageous. For example, articles may be formed in the glass phase to the desired shapes and dimensions (i.e., in near-net shape), followed by heat treatment to at least partially crystallize the glass. As a result, substantial cost savings associated with the manufacturing and machining of the crystallized material may be realized.

In some embodiments, the glass has an x, y, z direction, each of which has a length of at least 1 cm (in some embodiments, at least 5 cm, or even at least 10 cm), wherein the glass has a volume, wherein the resulting glass-ceramic has an x, y, z direction, each of which has a length of at least 1 cm (in some embodiments, at least 5 cm, or even at least 10 cm), wherein the glass-ceramic has a volume of at least 70 (in some embodiments, at least 75, 80, 85, 90, 95, 96, or even at least 97) percent of the glass volume.

For example, during heat-treatment of some exemplary glasses for making glass-ceramics, formation of phases such as $La_2Zr_2O_7$ and/or cubic/tetragonal $ZrO_2$, in some cases monoclinic $ZrO_2$, may occur at temperatures above about 900° C. Although not wanting to be bound by theory, it is believed that zirconia-related phases are the first phases to nucleate from the glass. Formation of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generall occur at temperatures above about 925° C. Typically, crystallite size during this nucleation step is on order of nanometers. For example, crystals as small as 10–15 nanometers have been observed. For at least some embodiments, heat-treatment at about 1300° C. for about 1 hour provides a full crystallization. In generally, heat-treatment times for each of the nucleation and crystal growth steps may range of a few seconds (in some embodiments, even less than 5 seconds) to several minutes to an hour or more.

The average crystal size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel containing 125-micrometer diamonds, followed by 5 minutes of polishing with each of 45, 30, 15, 9, 3, and 1-micrometer slurries. The mounted and polished sample is sputtered with a thin layer of gold-palladium and viewed using a scanning electron microscopy (such as Model JSM 840A from JEOL, Peabody, Mass.). A typical back-scattered electron (BSE) micrograph of the microstructure found in the sample is used to determine the average crystallite size as follows. The number of crystallites that intersect per unit length ($N_L$) of a random straight line drawn across the micrograph are counted. The average crystallite size is determined from this number using the following equation.

$$\text{Average Crystallite Size} = 1.5/N_L M,$$

where $N_L$ is the number of crystallites intersected per unit length and M is the magnification of the micrograph.

In another aspect, glass-ceramics made according to the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 1 micrometer, less than 0.5 micrometer, less than 0.3 micrometer, or even less than less than 0.15 micrometer.

Examples of crystalline phases which may be present in ceramics according to the present invention include: alumina (e.g., alpha and transition aluminas), REO (e.g., $La_2O_3$), $Y_2O_3$, MgO, one or more other metal oxides such as BaO, CaO, $Cr_2O_3$, CoO, $Fe_2O_3$, $GeO_2$, $Li_2O$, MnO, NiO, $Na_2O$, $P_2O_5$, $Sc_2O_3$, $SiO_2$, SrO, $TeO_2$, $TiO_2$, $V_2O_3$, ZnO, $HfO_2$, $ZrO_2$ (e.g., cubic $ZrO_2$ and tetragonal $ZrO_2$), as well as "complex metal oxides" (including complex $Al_2O_3$.metal oxide (e.g., complex $Al_2O_3$.REO (e.g., $ReAlO_3$ (e.g., $GdAlO_3LaAlO_3$), $ReAl_{11}O_{18}$ (e.g., $LaAl_{11}O_{18}$,), and $Re_3Al_5O_{12}$ (e.g., $Dy_3Al_5O_{12}$)), complex $Al_2O_3$.$Y_2O_3$ (e.g., $Y_3Al_5O_{12}$), and complex $ZrO_2$.REO (e.g., $La_2Zr_2O_7$)), and combinations thereof. Typically, ceramics according to the present invention are free of eutectic microstructure features.

It is also with in the scope of the present invention to substitute a portion of the aluminum cations in a complex $Al_2O_3$.metal oxide (e.g., complex $Al_2O_3$.REO and/or complex $Al_2O_3$.$Y_2O_3$ (e.g., yttrium aluminate exhibiting a garnet crystal structure)) with other cations. For example, a portion of the Al cations in a complex $Al_2O_3$.$Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3 \cdot Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Further, for example, a portion of the rare earth cations in a complex $Al_2O_3 \cdot REO$ may be substituted with at least one cation of an element selected from the group consisting of: Y, Fe, Ti, Mn, V, Cr, Co, Ni, Cu, Mg, Ca, Sr, and combinations thereof. The substitution of cations as described above may affect the properties (e.g. hardness, toughness, strength, thermal conductivity, etc.) of the ceramic.

Crystals formed by heat-treating amorphous material to provide embodiments of glass-ceramics made according to the present invention may be, for example, acicular equi-axed, columnar, or flattened splat-like features.

Some exemplary glasses and glass-ceramics made according to the present invention, comprise at least 75 (in some embodiments, at least 80, or even at least 85) percent by weight $Al_2O_3$, $La_2O_3$ in a range from 0 to 25 (in some embodiments, 0 to 10, or even 0 to 5) percent by weight, $Y_2O_3$ in a range from 5 to 25 (in some embodiments, 5 to 20, or even 10 to 20) percent by weight, MgO in a range from 0 to 8 (in some embodiments, 0 to 4, or even 0 to 2) percent by weight, based on the total weight of the glass or glass-ceramic respectively. In some embodiments, the glass or glass-ceramic further comprises $SiO_2$ in an amount up to 10 (in some embodiments, in a range from 0.5 to 5, 0.5 to 2, or 0.5 to 1) percent by weight, based on the total weight of the glass or glass-ceramic, respectively.

Some exemplary glasses and glass-ceramics made according to the present invention, comprise at least 75 (in some embodiments, at least 80, 85, or even at least 90) percent by weight $Al_2O_3$ and $SiO_2$ in an amount up to 10 (in some embodiments, in a range from 0.5 to 5, 0.5 to 2, or 0.5 to 1) percent by weight, based on the total weight of the glass or glass-ceramic, respectively.

Although the glass or glass-ceramic may be in the form of a bulk material, it is also within the scope of the present invention to provide composites comprising a glass, glass-ceramic, etc. according to the present invention. Such a composite may comprise, for example, a phase or fibers (continuous or discontinuous) or particles (including whiskers) (e.g., metal oxide particles, boride particles, carbide particles, nitride particles, diamond particles, metallic particles, glass particles, and combinations thereof) dispersed in a glass, glass-ceramic, etc. according to the present invention, invention or a layered-composite structure (e.g., a gradient of glass-ceramic to glass used to make the glass-ceramic and/or layers of different compositions of glass-ceramics).

Certain glasses made according to the present invention may have, for example, a $T_g$ in a range of about 750° C. to about 950° C.

The average hardness of the glass-ceramics made according to the present invention can be determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel containing 125-micrometer diamonds, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 500-gram indent load. The microhardness measurements are made according to the guidelines stated in ASTM Test Method E384 Test Methods for Microhardness of Materials (1991). The average hardness is an average of 10 measurements.

Certain glasses made according to the present invention may have, for example, an average hardness of at least 5 GPa (in some embodiments, at least 6 GPa, 7 GPa, 8 GPa, or 9 GPa; typically in a range of about 5 GPa to about 10 GPa), and glass-ceramics made according to the present invention at least 5 GPa (in some embodiments, at least 6 GPa, 7 GPa, 8 GPa, 9 GPa, 10 GPa, 11 GPa, 12 GPa, 13 GPa, 14 GPa, 15 GPa, 16 GPa, 17 GPa, 18 GPa, 19 GPa, or 20 GPa (or more); typically in a range of about 5 GPa to about 20 GPa). Abrasive particles made according to the present invention have an average hardness of at least 15 GPa, in some embodiments, at least 16 GPa, at least 17 GPa, 18 GPa, 19 GPa, or even at least 20 GPa.

Certain glasses made according to the present invention may have, for example, a thermal expansion coefficient in a range of about $5 \times 10^{-6}$/K to about $11 \times 10^{-6}$/K over a temperature range of at least 25° C. to about 900° C.

Typically, and desirably, the (true) density, sometimes referred to as specific gravity, of glasses and glass-ceramics made according to the present invention is typically at least 70% of theoretical density. More desirably, the (true) density of glasses and glass-ceramics made according to the present invention is at least 75%, 80%, 85%, 90%, 95%, 96%, 97%, 98%, 99%, 99.5% or even 100% of theoretical density. Abrasive particles made according to the present invention have densities of at least 85%, 90%, 92%, 95%, 96%, 97%, 98%, 99%, 99.5% or even 100% of theoretical density.

Articles can be made using glasses and glass-ceramics made according to the present invention, for example, as a filler, reinforcement material, and/or matrix material. For example, glasses and glass-ceramics made according to the present invention can be in the form of particles and/or fibers suitable for use as reinforcing materials in composites (e.g., ceramic, metal, or polymeric (thermosetting or thermoplastic)). The particles and/or fibers may, for example, increase the modulus, heat resistance, wear resistance, and/or strength of the matrix material. Although the size, shape, and amount of the particles and/or fibers used to make a composite may depend, for example, on the particular matrix material and use of the composite, the size of the reinforcing particles typically range from about 0.1 to 1500 micrometers, more typically 1 to 500 micrometers, and desirably between 2 to 100 micrometers. The amount of particles for polymeric applications is typically about 0.5 percent to about 75 percent by weight, more typically about 1 to about 50 percent by weight. Examples of thermosetting polymers include: phenolic, melamine, urea formaldehyde, acrylate, epoxy, urethane polymers, and the like. Examples of thermoplastic polymers include: nylon, polyethylene, polypropylene, polyurethane, polyester, polyamides, and the like.

Examples of uses for reinforced polymeric materials (i.e., reinforcing particles made according to the present invention dispersed in a polymer) include protective coatings, for example, for concrete, furniture, floors, roadways, wood, wood-like materials, ceramics, and the like, as well as, anti-skid coatings and injection molded plastic parts and components.

Further, for example, glasses and glass-ceramics made according to the present invention can be used as a matrix material. For example, glasses and glass-ceramics made according to the present invention can be used as a binder for ceramic materials and the like such as diamond, cubic-BN, $Al_2O_3$, $ZrO_2$, $Si_3N_4$, and SiC. Examples of useful articles comprising such materials include composite substrate coatings, cutting tool inserts abrasive agglomerates, and bonded abrasive articles such as vitrified wheels. The glasses and glass-ceramics made according to the present invention can be used as binders, for example, to increase the modulus, heat resistance, wear resistance, and/or strength of the composite article.

Abrasive particles made according to the present invention generally comprise crystalline ceramic (e.g., at least 75, 80, 85, 90, 91, 92, 93, 94, 95, 96, 97, 98, 99, 99.5, or even 100 percent by volume crystalline ceramic). In another aspect, the present invention provides a plurality of particles having a particle size distribution ranging from fine to coarse, wherein at least a portion of the plurality of particles are abrasive particles according to the present invention. In another aspect, embodiments of abrasive particles made according to the present invention generally comprise (e.g., at least 75, 80, 85, 90, 91, 92, 93, 94, 95, 96, 97, 98, 99, 99.5, or even 100 percent by volume) glass-ceramic made according to the present invention.

Abrasive particles made according to the present invention can be screened and graded using techniques well known in the art, including the use of industry recognized grading standards such as ANSI (American National Standard Institute), FEPA (Federation Europeenne des Fabricants de Products Abrasifs), and JIS (Japanese Industrial Standard). Abrasive particles made according to the present invention may be used in a wide range of particle sizes, typically ranging in size from about 0.1 to about 5000 micrometers, 1 to about 2000 micrometers, desirably from about 5 to about 1500 micrometers, or even, in some embodiments, about 100 to about 1500 micrometers.

In a given particle size distribution, there will be a range of particle sizes, from coarse particles to fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P 1000, and P 1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

After crushing and screening, there will typically be a multitude of different abrasive particle size distributions or grades. These multitudes of grades may not match a manufacturer's or supplier's needs at that particular time. To minimize inventory, it is possible to recycle the off demand grades back into melt to form glass. This recycling may occur after the crushing step, where the particles are in large chunks or smaller pieces (sometimes referred to as "fines") that have not been screened to a particular distribution.

In another aspect, the present invention provides a method for making abrasive particles, the method comprising heat-treating glass particles or particles comprising glass described herein to provide abrasive particles comprising a glass-ceramic according to the present invention. Alternatively, for example, the present invention provides a method for making abrasive particles, the method comprising heat-treating glass described herein, and crushing the resulting heat-treated material to provide abrasive particles comprising a glass-ceramic according to the present invention. When crushed, glass tends to provide sharper particles than crushing significantly crystallized glass-ceramics or crystalline material.

In another aspect, the present invention provides agglomerate abrasive grains each comprising a plurality of abrasive particles made according to the present invention bonded together via a binder. In another aspect, the present invention provides an abrasive article (e.g., coated abrasive articles, bonded abrasive articles (including vitrified, resinoid, and metal bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) made according to the present invention. Methods of making such abrasive articles and using abrasive articles are well known to those skilled in the art. Furthermore, abrasive particles made according to the present invention can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. The backing can be any suitable material, including cloth, polymeric film, fibre, nonwoven webs, paper, combinations thereof, and treated versions thereof. Suitable binders include inorganic or organic binders (including thermally curable resins and radiation curable resins). The abrasive particles can be present in one layer or in two layers of the coated abrasive article.

An example of a coated abrasive article is depicted in FIG. 1. Referring to FIG. 1, coated abrasive article 1 has a backing (substrate) 2 and abrasive layer 3. Abrasive layer 3 includes abrasive particles made according to the present invention 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3–50% by volume bond material, about 30–90% by volume abrasive particles (or abrasive particle blends), up to 50% by volume additives (including grinding aids), and up to 70% by volume pores, based on the total volume of the bonded abrasive article.

Figure 2:
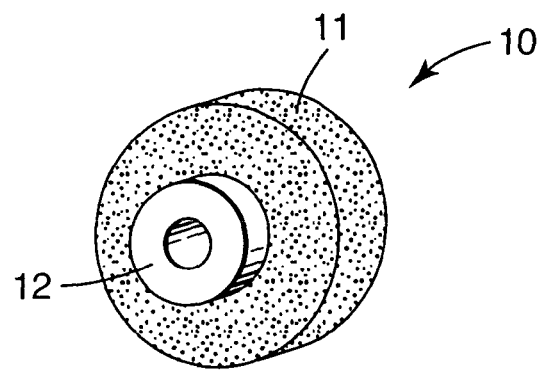
FIG. 2 is a perspective view of a bonded abrasive article including abrasive particles according to the present invention.

An exemplary grinding wheel is shown in FIG. 2. Referring to FIG. 2, grinding wheel 10 is depicted, which includes abrasive particles made according to the present invention 11, molded in a wheel and mounted on hub 12.

Figure 3:
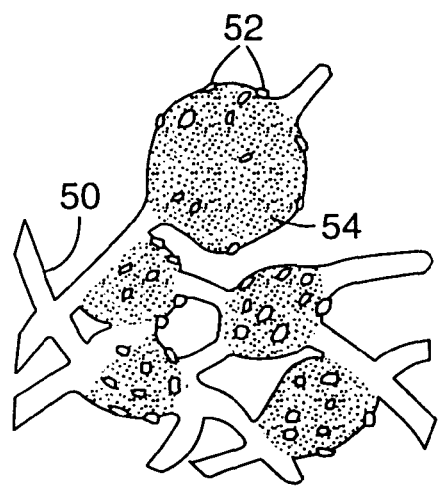
FIG. 3 is an enlarged schematic view of a nonwoven abrasive article including abrasive particles according to the present invention.

Nonwoven abrasive articles typically include an open porous lofty polymer filament structure having abrasive particles made according to the present invention distributed throughout the structure and adherently bonded therein by an organic binder. Examples of filaments include polyester fibers, polyamide fibers, and polyaramid fibers. An exemplary nonwoven abrasive article is shown in FIG. 3. Referring to FIG. 3, a schematic depiction, enlarged about 100×, of a typical nonwoven abrasive article is shown, comprises fibrous mat 50 as a substrate, onto which abrasive particles made according to the present invention 52 are adhered by binder 54.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.)). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may be thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.).

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles according to the present invention may be in the shape of a wheel (including cut off wheels), honing stone, mounted pointed or other conventional bonded abrasive shape. In some embodiments, a vitrified bonded abrasive article according to the present invention is in the form of a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

In some embodiments, vitrified bonding materials include those comprising silica, alumina (desirably, at least 10 percent by weight alumina), and boria (desirably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50–300 g/m$^2$ (desirably, about 80–160 g/m$^2$). In vitrified bonded abrasive articles grinding aid is typically impregnated into the pores of the article.

The abrasive articles can contain 100% abrasive particles according to the present invention, or blends of such abrasive particles with other abrasive particles and/or diluent particles. However, at least about 2% by weight, desirably at least about 5% by weight, and more desirably about 30–100% by weight, of the abrasive particles in the abrasive articles should be abrasive particles made according to the present invention. In some instances, the abrasive particles made according to the present invention may be blended with another abrasive particles and/or diluent particles at a ratio between 5 to 75% by weight, about 25 to 75% by weight about 40 to 60% by weight, or about 50% to 50% by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of Sol gel abrasive particles include those described in U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. No. 5,551,963 (Larmie). Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen). Additional details concerning fused abrasive particles, can be found, for example, in U.S. Pat. No. 1,161,620 (Coulter), U.S. Pat. No. 1,192,709 (Tone), U.S. Pat. No. 1,247,337 (Saunders et al.), U.S. Pat. No. 1,268,533 (Allen), and U.S. Pat. No. 2,424,645 (Baumann et al.), U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), U.S. Pat. No. 5,023,212 (Dubots et al.), U.S. Pat. No. 5,143,522 (Gibson et al.), and U.S. Pat. No. 5,336,280 (Dubots et al.), and applications having U.S. Ser. Nos. 09/495,978, 09/496,422, 09/496,638, and 09/496,713, each filed on Feb. 2, 2000; Ser. Nos. 09/618,876, 09/618,879, 09/619,106, 09/619,191, 09/619,192, 09/619,215, 09/619,289, 09/619,563, 09/619,729, 09/619,744, and 09/620,262, each filed on Jul. 19, 2000; Ser. No. 09/704,843, filed Nov. 2, 2000; and Ser. No. 09/772,730, filed Jan. 30, 2001. Additional details concerning ceramic abrasive particles, can be found, for example, in applications having U.S. Ser. Nos. 09/922,526, 09/922,527, 09/922,528, and 09/922,530, each filed Aug. 2, 2001, now abandoned, Ser. Nos. 10/211,597, 10/211,638, 10/211,629, 10/211,598, 10/211,630, 10/211,639, 10/211,034, 10/211,044, 10/211,628, 10/211,491, 10/211,640, and 10/211,684, each filed Aug. 2, 2002; and Ser. Nos. 10/358,772, 10/358,765, 10/358,910, 10/358,855, and 10/358,708, each filed Feb. 5, 2003. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles made according to the present invention, with the smaller sized particles being another abrasive particle type. Conversely, for example, the smaller sized abrasive particles may be abrasive particles made according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates. Abrasive particles made according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), and applications having U.S. Ser. Nos. 09/688,444 and 09/688,484, each filed Oct. 16, 2000; Ser. No. 09/688,444, 09/688,484, and 09/688,486, each filed Oct. 16, 2000; and Ser. Nos. 09/971,899, 09/972,315, and 09/972,316, each filed Oct. 5, 2001.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles made according to the present invention, and the second (outermost) layer comprises abrasive particles made according to the present invention. Likewise in a bonded abrasive, there may be two distinct sections of the grinding wheel. The outermost section may comprise abrasive particles made according to the present invention, whereas the innermost section does not. Alternatively, abrasive particles made according to the present invention may be uniformly distributed throughout the bonded abrasive article.

Further details regarding coated abrasive articles can be found, for example, in U.S. Pat. Nos. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christianson). Further details regarding bonded abrasive articles can be found, for example, in U.S. Pat. No. 4,543, 107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,037,453 (Narayanan et al.), U.S. Pat. No. 5,110,332 (Narayanan et al.), and U.S. Pat. No. 5,863,308 (Qi et al.). Further details regarding vitreous bonded abrasives can be found; for example, in U.S. Pat. No. 4,543,107 (Rue), U.S. Pat. No. 4,898,597 (Hay et al.), U.S. Pat. No. 4,997,461 (Markhoff-Matheny et al.), U.S. Pat. No. 5,094,672 (Giles Jr. et al.), U.S. Pat. No. 5,118,326 (Sheldon et al.), U.S. Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi). Further details regarding nonwoven abrasive articles can be found, for example, in U.S. Pat. No. 2,958,593 (Hoover et al.).

The present invention provides a method of abrading a surface, the method comprising contacting at least one abrasive particle made according to the present invention, with a surface of a workpiece; and moving at least of one the abrasive particle or the contacted surface to abrade at least a portion of said surface with the abrasive particle. Methods for abrading with abrasive particles made according to the present invention range from snagging (i.e., high pressure high stock removal) to polishing (e.g., polishing medical implants with coated abrasive belts), wherein the latter is typically done with finer grades (e.g., ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles made according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles made according to the present invention may be useful, for example, to abrade workpieces such as aluminum metal, carbon steels, mild steels, tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated. Unless otherwise stated, all examples contained no significant amount of $SiO_2$, $B_2O_3$, $P_2O_5$, $GeO_2$, $TeO_2$, $As_2O_3$, and $V_2O_5$.

EXAMPLES 1–4

A 250-ml polyethylene bottle (7.3-cm diameter) was charged with a 50-gram mixture of various powders (as shown below in Table 1, below), with sources of the raw materials listed in Table 2 (below) and 50 grams of isopropyl alcohol.

TABLE 1

| Example | Raw materials amounts, g | Oxide equivalent* of the components, % by weight | Silica Source |
| --- | --- | --- | --- |
| 1 | $Al_2O_3$: 11.3<br>Al: 19.3<br>$Y_2O_3$: 11.2<br>TEOS: 8.1 | $Al_2O_3$: 78<br>$Y_2O_3$: 18<br>$SiO_2$: 4 | Tetraethyl orthosilicate (TEOS) |
| 2 | $Al_2O_3$: 10.9<br>Al: 18.5<br>$Y_2O_3$: 10.7<br>STA: 9.9 | $Al_2O_3$: 78<br>$Y_2O_3$: 18<br>$SiO_2$: 4 | Silicon tetraacetate (STA) |
| 3 | $Al_2O_3$: 12.6<br>Al: 21.4<br>$Y_2O_3$: 12.4<br>DMS: 3.7 | $Al_2O_3$: 78<br>$Y_2O_3$: 18<br>$SiO_2$: 4 | Dimethyl silane, tetramethyl siloxane terminated |
| 4 | $Al_2O_3$: 12.6<br>Al: 21.5<br>$Y_2O_3$: 12.5<br>DMS-H: 3.3 | $Al_2O_3$: 78<br>$Y_2O_3$: 18<br>$SiO_2$: 4 | Dimethyl silane hydroxyl terminated |

*i.e., the relative amount of oxide when the Al metal is converted to $Al_2O_3$

TABLE 2

| Raw Material | Source |
| --- | --- |
| Alumina ($Al_2O_3$) particles | Obtained from Alcoa Industrial Chemicals, Bauxite, AR, under the trade designation "Al6SG" |
| Aluminum (Al) particles | Obtained from Alfa Aesar, Ward Hill, MA |
| Yttrium oxide ($Y_2O_3$) particles | Obtained from H. C. Stark Newton, MA |
| Tetraethyl orthosilicate (TEOS) | Obtained from Alfa Aesar |
| Silicon tetraacetate (STA) | Obtained from Alfa Aesar |
| Dimethyl silane, tetramethyl siloxane terminated. | Obtained from Alfa Aesar |
| Dimethyl silane, hydroxyl terminated | Obtained from Alfa Aesar |

The resulting slurry was continuously stirred on a magnetic stir plate for 10 minutes. While stirring the slurry, 5 ml of water was added dropwise. The slurry continued to be stirred for 30 minutes after adding the water. The polyethylene bottle was removed from the stir plate and about 200 grams of alumina milling media (cylindrical shape, both height and diameter of 0.635 cm; 99.9% alumina; obtained from Coors, Golden, Colo.) was added. The contents of the polyethylene bottle were milled for 16 hours at 60 revolutions per minute (rpm). After the milling, the milling media were removed and the slurry poured onto a warm (approximately 75° C.) glass ("PYREX") pan in a layer, and allowed to cool and dry. Due to the relatively thin layer of the material (i.e., about 3 mm think) of slurry and the warm pan, the slurry formed a cake within 5 minutes and dried in about 30 minutes. The dried mixture was ground by screening through a 70-mesh screen (212-micrometer opening size) with the aid of a paint brush.

The resulting screened particles were fed slowly (about 0.5 gram/minute) into a hydrogen/oxygen torch flame which melted the particles and carried them directly into a 19-liter (5-gallon) cylindrical container (30 centimeters (cm) diameter by 34 cm height) of continuously circulating, turbulent water (20° C.) to rapidly quench the molten droplets. The torch was a Bethlehem bench burner PM2D Model B obtained from Bethlehem Apparatus Co., Hellertown, Pa. Hydrogen and oxygen flow rates for the torch were as follows. For the inner ring, the hydrogen flow rate was 8 standard liters per minute (SLPM) and the oxygen flow rate was 3.5 SLPM. For the outer ring, the hydrogen flow rate was 23 SLPM and the oxygen flow rate was 12 SLPM. The angle at which the flame hit the water was approximately 45°, and the flame length, burner to water surface, was approximately 18 centimeters. The resulting (quenched) beads were collected in a pan and heated at 110° C. in an electrically heated furnace till dried (about 30 minutes). The beads were spherical in shape and varied in size from a few micrometers (i.e., microns) up to 250 micrometers and were either transparent (i.e. amorphous) and/or opaque (i.e. crystalline), varying within a sample. Although not wanting to be bound by theory, it is believed that generally, amorphous materials (including glasses) are transparent due to lack of light scattering centers such as crystal boundaries, while crystalline materials are opaque due to light scattering effects of crystal boundaries. Until proven to be amorphous and glass by Differential Thermal Analysis (DTA), the transparent flame-formed beads were considered to be only amorphous.

Comparative A

A 250-ml polyethylene bottle (7.3-cm diameter) was charged with a 50-gram mixture of various powders (as shown below in Table 3 (below), with sources of the raw materials listed in Table 4 (below)), 50 grams of isopropyl alcohol, and 200 grams of alumina milling media (cylindrical shape, both height and diameter of 0.635 cm; 99.9% alumina; obtained from Coors, Golden, Colo.).

TABLE 3

| Example | Raw materials amounts, g | Oxide equivalent* of the components, % by weight | Silica Source |
|---------|--------------------------|--------------------------------------------------|---------------|
| Comp. A | $Al_2O_3$: 13.5<br>Al: 21.4<br>$Y_2O_3$: 12.1<br>$SiO_2$: 2.8 | $Al_2O_3$: 78<br>$Y_2O_3$: 18<br>$SiO_2$: 4 | Particulate |

TABLE 4

| Raw Material | Source |
|---|---|
| Alumina ($Al_2O_3$) particles | Obtained from Alcoa Industrial Chemicals, under the trade designation "A16SG" |
| Aluminum (Al) particles | Obtained from Alfa Aesar |
| Yttrium oxide ($Y_2O_3$) particles | Obtained from H. C. Stark Newton, MA |
| Silica ($SiO_2$) particles | Obtained from Alfa Aesar, −325 mesh particle size |

The contents of the polyethylene bottle were milled for 16 hours at 60 revolutions per minute (rpm). After the milling, the milling media were removed and the slurry poured onto a warm (approximately 75° C.) glass ("PYREX") pan in a layer, and allowed to cool and dry. Due to the relatively thin layer of the material (i.e., about 3 mm think) of slurry and the warm pan, the slurry formed a cake within 5 minutes and dried in about 30 minutes. The dried mixture was ground by screening through a 70-mesh screen (212-micrometer opening size) with the aid of a paint brush. The resulting screened particles were flame-formed as described for Examples 1–4.

The phase composition (glassy/amorphous/crystalline) of the Example 1–4 and Comparative Example A materials were determined using Differential Thermal Analysis (DTA) as described below. The material was classified as amorphous if the corresponding DTA trace of the material contained an exothermic crystallization event ($T_x$). If the same trace also contained an endothermic event ($T_g$) at a temperature lower than $T_x$ it was considered to consist of a glass phase. If the DTA trace of the material contained no such events, it was considered to contain crystalline phases.

Differential thermal analysis (DTA) was conducted using the following method. DTA runs were made (using an instrument obtained from Netzsch Instruments, Selb, Germany under the trade designation "NETZSCH STA 409 DTA/TGA") using a −140+170 mesh size fraction (i.e., the fraction collected between 105 micrometer opening size and 90 micrometer opening size screens). The amount of each screened sample placed in a 100-microliter $Al_2O_3$ sample holder was about 400 mg. Each sample was heated in static air at a rate of 10° C./minute from room temperature (about 25° C.) to 1100° C.

Figure 4:
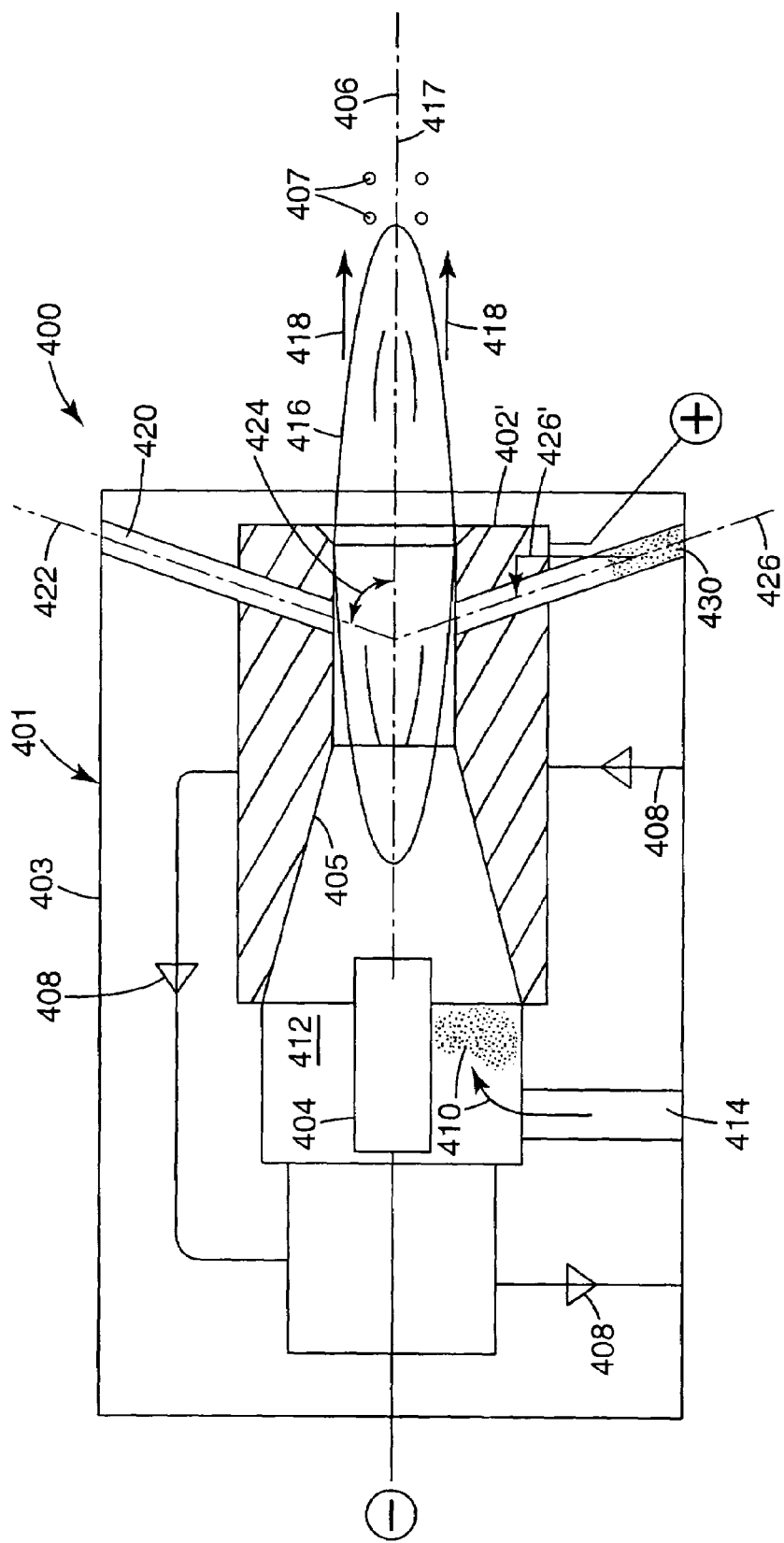
FIG. 4 is a schematic of an exemplary plasma spray apparatus for practicing embodiments of the present invention.
Figure 5:
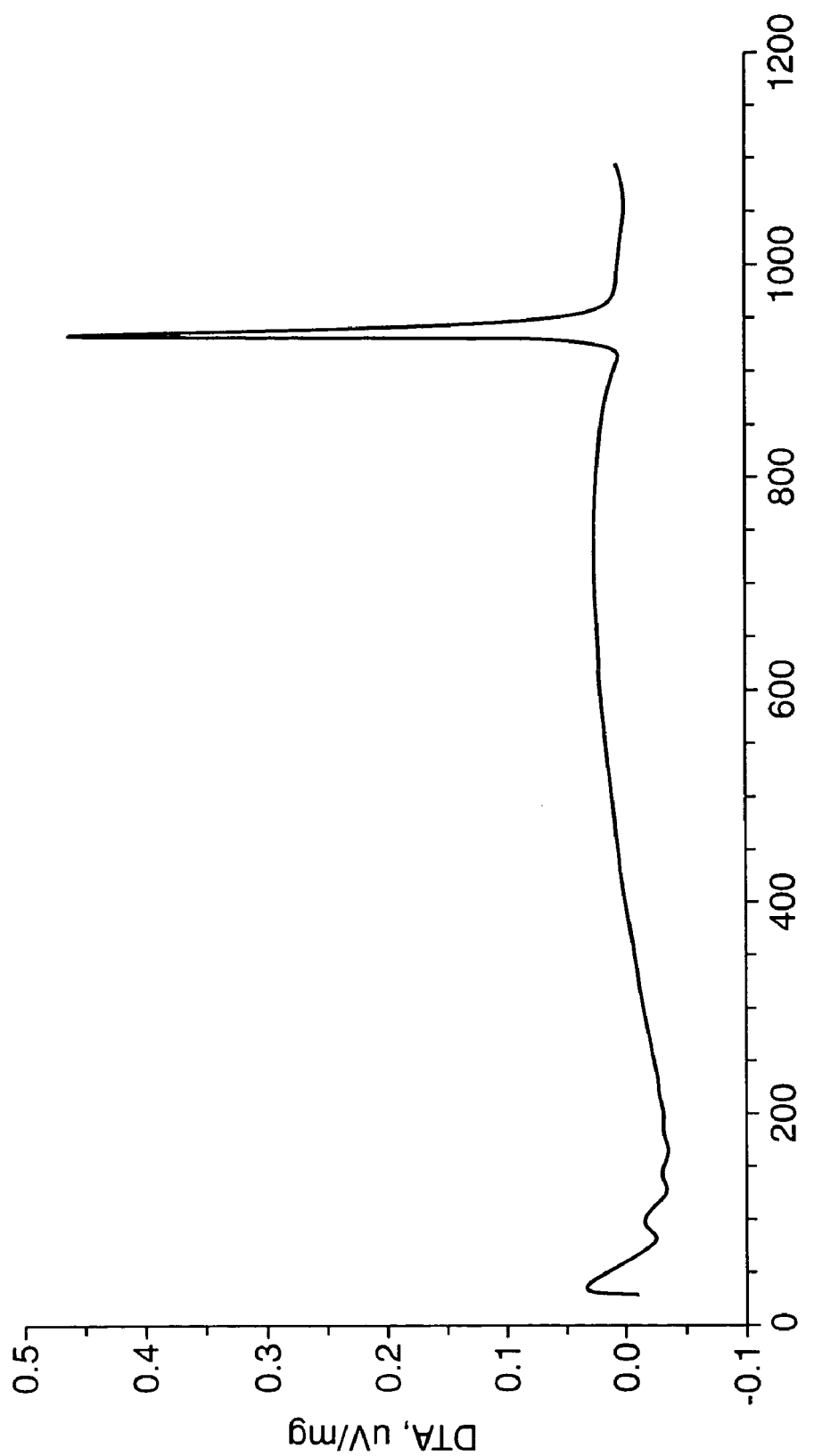
FIG. 5 is a DTA trace of material prepared in Example 1.

Referring to FIG. 5, line 123 is the plotted DTA data for the Example 1 material. Referring to FIG. 4, line 123, the material exhibited an endothermic event at temperature around 905° C., as evidenced by the downward curve of line 123. It is believed this event was due to the glass transition ($T_g$) of the glass material. At about 933° C., an exothermic event was observed as evidenced by the sharp peak in line 123. It is believed that this event was due to the crystallization ($T_x$) of the material.

The $T_g$ and $T_x$ values for Examples 1–4 and Comparative A are reported in Table 5, below.

TABLE 5

| Example | Glass transition temperature, $T_g$, ° C. | Glass crystallization temperature, $T_x$, ° C. | $T_x - T_g$, ° C. |
|---|---|---|---|
| 1 | 905 | 933 | 28 |
| 2 | 907 | 937 | 30 |
| 3 | 909 | 935 | 26 |
| 4 | 908 | 933 | 25 |
| Comp. A | 915 | 940 | 25 |

The temperature window between the glass transition and glass crystallization temperatures (Tx–Tg), as determined from the DTA traces of the examples, were all within 5° C. of Comparative Example A. It is believed that this suggests full conversion to the oxide for each different silica source.

Glass Beads of Example 1–4 and Comparative Example A were crystallized at 1350° C. for 1 hour in an electrically heated furnace (obtained from CM Furnaces, Bloomfield, N.J. under the trade designation "Rapid Temp Furnace"). Powder X-ray diffraction, XRD, (using an X-ray diffractometer (obtained under the trade designation "PHILLIPS XRG 3100" from Phillips, Mahwah, N.J.) with copper K α1 radiation of 1.54050 Angstrom) was used to determine the phases present in the crystallized beads.

The phases were determined by comparing the peaks present in the XRD trace of the crystallized material to XRD patterns of crystalline phases provided in JCPDS databases, published by International Center for Diffraction Data. The resulting crystalline material determined for Examples 1–4 was similar to those found for Comparative A and consisted of $3Y_2O_3 \cdot 5Al_2O_3$, alpha $Al_2O_3$ and trace $Y_2O_3$ phases.

About 50 grams of the glass beads of Example 1 were encapsulated (i.e., canned) in 5 cm diameter×1.4 cm thick stainless steel foil containers and sealed under vacuum. The encapsulated beads were then placed in a Hot Isostatic Press (HIP) (obtained form American Isostatic Presses, Inc., Columbus, Ohio under the trade designation "IPS EAGLE-6"). The HIPing was carried out at a peak temperature of 970° C., and at about 3000 atm pressure of argon gas. The HIP furnace was first ramped up to 970° C. at 12.3° C./minute. The temperature was held at 970° C. for 20 minutes, after which the temperature the power was turned off, and the furnace allowed to cool to 100° C. The argon gas pressure was applied at a rate of 65 atm/minute. Argon gas pressure reached 3000 atm when the temperature of the furnace was 750° C. This pressure was maintained until the temperature of the furnace was allowed to cool down to about 750° C. The pressure was released at a rate of 60 atm/minutes. The resulting disks, 4 cm in diameter and 1 cm in thickness, were crushed using a hammer into about −30+50 mesh size fraction (i.e., the fraction collected between 600-micrometer opening size and 300-micrometer opening size screens). The density of the screened glass particles (−30+50 mesh size fraction) was measured using a gas pycnometer (obtained from Micromeritics, Norcross, Ga., under the trade designation "ACCUPYC 1330"). The density of the particles was determined to be 3.97 g/cm³.

Differential thermal analysis (DTA) of the screened glass particles was conducted using method describe in Comparative Example A. The material exhibited a glass transition ($T_g$), evident by an endothermic event, at temperature around 974° C. The material exhibited a crystallization temperature ($T_x$) at about 1120° C., as evidenced by an exothermic event. The material was thus determined to be amorphous following the coalescing procedure.

The crushed and screened glass particles were crystallized at 1300° C. for 15 minutes in an electrically heated furnace (obtained from CM Furnaces, Bloomfield, N.J. under the trade designation "Rapid Temp Furnace"). The density of the crystallized particles (−30+50 mesh size fraction) was measured using the gas pycnometer ("ACCUPYC 1330"). The density of the particles was determined to be 4.11 g/cm³.

The average hardness of these crystallized particles of Example 1 was determined as follows. Sections of the material were mounted in mounting resin (obtained under the trade designation "TRANSOPTIC POWDER" from Buehler, Lake Bluff, Ill.). The resulting cylinder of resin was about 2.5 cm in diameter and about 1.9 cm high. The mounted section was prepared using conventional polishing techniques using a polisher (obtained from Buehler, Lake Bluff, Ill. under the trade designation "ECOMET 3"). The sample was polished for about 3 minutes with a diamond wheel containing 125-micrometer diamonds, followed by 5 minutes of polishing with each of 45, 30, 15, 9, 3, and 1-micrometer slurries. The microhardness measurements were made using a conventional microhardness tester (obtained under the trade designation "MITUTOYO MVK-VL" from Mitutoyo Corporation, Tokyo, Japan) fitted with a Vickers indenter using a 500-gram indent load. The microhardness measurements were made according to the guidelines stated in ASTM Test Method E384 Test Methods for Microhardness of Materials (1991). The average microhardness (an average of 20 measurements) of the material of this crystallized Example 1 material was 20 gigapascals (GPa).

The average crystal size of this crystallized Example 1 material was determined by the line intercept method according to the ASTM standard E 112-96 "Standard Test Methods for Determining Average Grain Size". The mounted and polished sample, previously prepared to measure the hardness, was coated with a thin layer of gold-palladium and view using a JEOL SEM (Model JSM 840A).

A typical back-scattered electron (BSE) micrograph of the microstructure found in the sample was used to determine the average crystal size as follows. The number of crystals that intersected per unit length ($N_L$) of a random line were drawn across the micrograph was counted. The average crystal size is determined from this number using the following equation.

$$\text{Average Crystal Size} = \frac{1.5}{N_L M}$$

Where $N_L$ is the number of crystals intersected per unit length and M is the magnification of the micrograph. The average crystal size for this crystallized Example 1 material was 145 nm, as measured by line-intercept method.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for making glass comprising:
feeding at least $Al_2O_3$ source and $SiO_2$ source, into one of a flame or a plasma to provide a melt wherein the $SiO_2$ source is at least one of polymeric $SiO_2$ source or organometallic $SiO_2$ source; and
cooling the melt to provide the glass, wherein the glass comprises at least 35 percent by weight $Al_2O_3$ and $SiO_2$ in a range from 0.5 to 10 percent by weight, and not more than 10 percent by weight collectively $As_2O_3$, $B_2O_3$, $GeO_2$, $P_2O_5$, $SiO_2$, $TeO_2$, and $V_2O_5$, based on the total weight of the glass.

2. The method according to claim 1, wherein at least a portion of the $SiO_2$ source is the polymeric $SiO_2$ source.

3. The method according to claim 2, wherein the polymeric $SiO_2$ source includes at least one of a silanes, silica sol, silica gel, silicone, or silicone oil.

4. The method according to claim 1, wherein at least a portion of the $SiO_2$ source is the organometallic $SiO_2$ source.

5. The method according to claim 4, wherein the organometallic $SiO_2$ source includes at least one of silicon alkoxides, silicon acetate, silicon tetrachloride, or silicotungstic acid.

6. The method according to claim 1, wherein the glass further comprises at least one metal oxide selected from the group consisting of $Y_2O_3$, $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Tb_2O_3$, $Th_4O_7$, $Tm_2O_3$, $Yb_2O_3$, $MgO$, $TiO_2$, $Cr_2O_3$, $CuO$, $ZrO_2$, $SrO$, $LiO_2$, $NiO$, $ZrO_2$, and $Fe_2O_3$.

7. The method anconding to claim 1, wherein the glass comprises at least 60 percent by weight $Al_2O_3$, based on the total weight of the glass.

8. The method according to claim 1, wherein the glass comprises at least 70 percent by weight $Al_2O_3$, based on the total weight of the glass.

9. The method according to claim 1, wherein the glass comprises at least 80 percent by weight $A_2O_3$, based on the total weight of the glass.

10. The method according to claim 1, further comprising heat-treating the glass to convert at least a portion of the glass to crystalline ceramic and provide the glass-ceramic.

11. The method according to claim 10, wherein the glass further comprises at least one metal oxide selected from the group consisting of $Y_2O_3$, $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Tb_2O_3$, $Th_4O_7$, $Tm_2O_3$, $Yb_2O_3$, MgO, $TiO_2$, $Cr_2O_3$, CuO, $ZrO_2$, SrO, $LiO_2$, NiO, $ZrO_2$, and $Fe_2O_3$.

12. The method according to claim 10, wherein the glass comprises at least 60 percent by weight $Al_2O_3$, based on the total weight of the glass.

13. The method according to claim 10, wherein the glass comprises at least 70 percent by weight $Al_2O_3$, based on the total weight of the glass.

14. The method according to claim 10, wherein the glass comprises at least 80 percent by weight $Al_2O_3$, based on the total weight of the glass.

15. The method according to claim 1, wherein the glass is in the form of glass particles, and wherein the method further comprises heat-treating the glass to convert at least a portion of the glass to crystalline ceramic and provide glass-ceramic abrasive particles.

16. The method according to claim 15, wherein the glass-ceramic has an average crystallite size of less than 150 nanometers.

17. The method according to claim 15, wherein the glass-ceramic has an average density of at least 95 percent of theoretical density.

18. The method according to claim 15, wherein the glass-ceramic has an average hardness of at least 16 GPa.

19. The method according to claim 15, wherein the glass-ceramic has an average hardness of at least 17 GPa.

20. The method according to claim 15, wherein the glass-ceramic has an average hardness of at least 18 GPa.

21. The method according to claim 15, wherein the glass-ceramic has an average hardness of at least 20 GPa.

22. The method according to claim 15, further comprises grading the abrasive particles to provide a plurality of abrasive particles having a specified nominal grade.

23. The method according to the claim 15, the glass particles to be heat-treated are provided as a plurality of particles having a specified nominal grade, and wherein at least a portion of the particles is a plurality of the glass particles.

24. The method according to the claim 15, further comprising incorporating the abrasive particles into an abrasive article.

25. The method according to claim 1, wherein the method further comprises heat-treating the glass to convert at least a portion of the glass to crystalline ceramic and provide glass-ceramic, and crushing the glass-ceramic to provide abrasive particles.

26. The method according to claim 25, wherein the glass-ceramic has an average crystallite size of less than 150 nanometers.

27. The method according to claim 25, wherein the glass-ceramic has an average density of at least 95 percent of theoretical density.

28. The method according to claim 25, wherein the glass-ceramic has an average hardness of at least 16 GPa.

29. The method according to claim 25, wherein the glass-ceramic has an average hardness of at least 17 GPa.

30. The method according to claim 25, wherein the glass-ceramic has an average hardness of at least 18 GPa.

31. The method according to claim 19, further comprises grading the abrasive particles to provide a plurality of abrasive particles having a specified nominal grade.

32. A method for making an article, the method comprising:

feeding at least $Al_2O_3$ source and $SiO_2$ source into one of a flame or a plasma to provide a melt, wherein the $SiO_2$ source is at least one of polymeric $SiO_2$ source or organometallic $SiO_2$ source;

cooling the melt to provide glass beads, wherein the glass comprises at least 35 percent by weight $Al_2O_3$ and $SiO_2$ in a range from 0.5 to 10 percent by weight, and not more than 10 percent by weight collectively $As_2O_3$, $B_2O_3$, $GeO_2$, $P_2O_5$, $SiO_2$, $TeO_2$, and $V_2O_5$, based on the total weight of the glass, the glass having a $T_g$;

heating the glass beads above the $T_g$ such that the glass beads coalesce to form a shape;

cooling the coalesced shape to provide a glass article.

33. The method according to claim 32, further comprising heat-treating the glass article to convert at least a portion of the glass to crystalline ceramic and provide a glass-ceramic article.

34. The method according to claim 33, wherein glass-ceramic has an average crystallite size of less than 150 nanometers.

35. The method according to claim 33, wherein glass-ceramic has an average density of at least 95 percent of theoretical density.

36. The method according to claim 33, wherein the glass-ceramic has an average hardness of at least 16 GPa.

37. The method according to claim 33, wherein the glass-ceramic has an average hardness of at least 17 GPa.

38. The method according to claim 33, wherein the glass-ceramic has an average hardness of at least 18 GPa.

* * * * *

UNITED STATES PATENT AND TRADEMARK OFFICE
CERTIFICATE OF CORRECTION

PATENT NO.        : 7,197,896 B2
APPLICATION NO. : 10/655729
DATED             : April 3, 2007
INVENTOR(S)       : Ahmet Celikkaya It is certified that error appears in the above-identified patent and that said Letters Patent is hereby corrected as shown below:

Title Page
Item [54], Delete "AL$_2$O$_3$-SIO$_2$" and insert -- Al$_2$O$_3$-SiO$_2$ -- therefor.
Item [56] References Cited, FOREIGN PATENT DOCUMENTS, on Page 3, Col. 2, Line 2, before "134 638 A" delete "DE" and insert -- DD -- therefor.
Item [56] References Cited, OTHER PUBLICATIONS, on Page 4, Col. 1, Line 6, delete "368-374,." and insert -- 368-374. -- therefor.
Item [56] References Cited, OTHER PUBLICATIONS, on Page 4, Col. 2, Line 28, delete "Gd$_2$O$_3$ 5/3Al$_2$O$_3$,"" and insert -- Gd$_2$O$_3$·5/3Al$_2$O$_3$," -- therefor.
Item [56] References Cited, OTHER PUBLICATIONS, on Page 4, Col. 2, Line 55, delete "Al$_2$O$_3$ZrO$_2$-CeO$_2$" and insert -- Al$_2$O$_3$-ZrO$_2$-CeO$_2$ -- therefor.
Item [56] References Cited, OTHER PUBLICATIONS, on Page 5, Col. 1, Line 44, delete "Al$_2$O$_3$/REA10$_3$" and insert -- Al$_2$O$_3$/REAlO$_3$ -- therefor.
Item [56] References Cited, OTHER PUBLICATIONS, on Page 5, Col. 1, Line 68, delete "VAG" and insert -- YAG -- therefor.
Item [56] References Cited, OTHER PUBLICATIONS, on Page 5, Col. 2, Line 10, delete "AL$_2$O$_3$" and insert -- Al$_2$O$_3$ -- therefor.
Item [56] References Cited, OTHER PUBLICATIONS, on Page 6, Col. 1, Line 17, delete "YSiAlON" and insert -- YSiAlON -- therefor.

Column 1
Title, Delete "AL$_2$O$_3$-SIO$_2$" and insert -- Al$_2$O$_3$-SiO$_2$ -- therefor.

Column 5
Line 38, delete "oganometallic" and insert -- organometallic -- therefor.

Column 17
Line 67, delete "generall" and insert -- generally -- therefor.

Column 23
Line 23, delete "(lonta" and insert -- (Ionta -- therefor.

Column 24
Line 53, delete "tetrachloronaphtalene," and insert -- tetrachloronaphthalene, -- therefor.
Line 56, delete "tetrafluoroboate," and insert -- tetrafluoroborate, -- therefor.

UNITED STATES PATENT AND TRADEMARK OFFICE
CERTIFICATE OF CORRECTION

PATENT NO. : 7,197,896 B2
APPLICATION NO. : 10/655729
DATED : April 3, 2007
INVENTOR(S) : Ahmet Celikkaya It is certified that error appears in the above-identified patent and that said Letters Patent is hereby corrected as shown below:

Column 25
Line 12, delete "weight,and" and insert -- weight, and -- therefor.
Line 30, delete "Sol" and insert -- sol -- therefor.

Column 26
Line 39, before "09/688,444," delete "No." and insert -- Nos. -- therefor.
Line 57, before "4,734,104" delete "Nos." and insert -- No. -- therefor.

Column 29
Line 41, Below Table 3 insert -- *i.e., the relative amount of oxide when the Al metal is converted to $Al_2O_3$ --.

Column 30
Line 43, delete "(Tx-Tg)," and insert -- $(T_x-T_g)$, -- therefor.

Column 32
Line 52, In Claim 7, delete "ancording" and insert -- according -- therefor.
Line 59, In Claim 9, delete "$A_2O_3$," and insert -- $Al_2O_3$, -- therefor.

Signed and Sealed this

Sixth Day of May, 2008

JON W. DUDAS
*Director of the United States Patent and Trademark Office*